(12) United States Patent
Jin

(10) Patent No.: US 10,542,540 B2
(45) Date of Patent: Jan. 21, 2020

(54) NETWORK DEVICE AND METHOD FOR WIRELESS LOCAL AREA NETWORK SCHEDULING

(71) Applicant: Kabushiki Kaisha Toshiba, Minato-ku (JP)

(72) Inventor: Yichao Jin, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 93 days.

(21) Appl. No.: 15/816,662

(22) Filed: Nov. 17, 2017

(65) Prior Publication Data
US 2019/0159201 A1 May 23, 2019

(51) Int. Cl.
*H04W 72/04* (2009.01)
*H04W 72/12* (2009.01)
*H04L 5/00* (2006.01)
*H04W 84/12* (2009.01)

(52) U.S. Cl.
CPC ....... *H04W 72/0446* (2013.01); *H04L 5/0032* (2013.01); *H04W 72/1273* (2013.01); *H04W 72/1289* (2013.01); *H04W 84/12* (2013.01)

(58) Field of Classification Search
CPC ......... H04W 72/0446; H04W 72/1273; H04W 72/1278; H04W 84/18; H04W 84/20; H04L 5/0032
See application file for complete search history.

(56) References Cited

U.S. PATENT DOCUMENTS

| 9,705,737 B2 | 7/2017 | Wetterwald et al. | |
| 2007/0274320 A1* | 11/2007 | Joshi | H04L 45/302 370/395.2 |
| 2015/0023205 A1 | 1/2015 | Vasseur et al. | |
| 2015/0023324 A1* | 1/2015 | Logalbo | H04W 72/0446 370/336 |
| 2015/0327261 A1* | 11/2015 | Thubert | H04W 40/22 370/336 |

(Continued)

FOREIGN PATENT DOCUMENTS

| WO | WO 2016/014331 A1 | 1/2016 |
| WO | WO 2017/004353 A1 | 1/2017 |
| WO | WO 2017/037403 A1 | 3/2017 |

OTHER PUBLICATIONS

X. Vilajosana, et al. "Minimal IPv6 over the TSCH mode of IEEE 802.15.4e (6tisch)", Best Current Practice. RFC 8180, 2070-1721, May 2017, pp. 28.

(Continued)

*Primary Examiner* — Robert C Scheibel
(74) *Attorney, Agent, or Firm* — Oblon, McClelland, Maier & Neustadt, L.L.P.

(57) ABSTRACT

A network device for a wireless local area network, wherein the network device is operable to wirelessly communicate with a neighbouring device according to a schedule which allocates timeslots to communication between neighbouring devices. The network device has: a wireless receiver operable to receive a request from a child neighbouring device for at least one timeslot for communicating a first amount of data to the network device; a processor configured to allocate timeslots in a schedule to communication between the network device and the child neighbouring device.

21 Claims, 14 Drawing Sheets

(56) References Cited

U.S. PATENT DOCUMENTS

2016/0174192 A1* 6/2016 Raghu .............. H04W 72/1289
370/329
2017/0251471 A1* 8/2017 Jeong ................ H04W 52/0216
2018/0302911 A1 10/2018 Aijaz et al.

OTHER PUBLICATIONS

Snahiri Farahani, "ZigBee Wireless Networks and Transceivers." Newnespress. 2008, pp. 364.
Anna N. Kim et al. "When HART goes wireless: Understanding and Implementing the wirelessHART standard," 2008 IEEE International Conference on Emerging Technologies and Factory Automation, Sep. 2008, pp. 9.
Maria Rita Palatella et al., "On optimal scheduling in duty-cycled industrial IoT Applications Using IEEE802.15.4e TSCH," IEEE Sensors Journal, vol. 13, No. 10, Oct. 2013, pp. 12.
Nicola Accettura et al., "Decentralized Traffic Aware Scheduling in 6TISCH Networks: Design and Experimental Evaluation," IEEE Internet of Things Journal, vol. 2, No. 6, Dec. 2016, pp. 16.
Diego Dujovne et al., IETF draft: "6TISCH 6top Scheduling Function Zero (SF0)", https://datatracker.ietf.org/doc/draft-ietf-6tisch-6top-sf0/, Jul. 2017, pp. 14.
Diego Dujovne et al. "6TISCH: deterministic IP-enabled Industrial Internet (of things)," IEEE Communications Magazine, vol. 52, No. 12, Dec. 2014, pp. 6.
Yichao Jin et al., "A Centralized Scheduling Algorithm for IEEE 802.15.4e TSCH based Industrial Low Power Wireless Networks," IEEE Wireless Communications and Networking Conference WCNC, 2016, pp. 6.
Simon Duquennoy, et al., "Orchestra: Robust Mesh Networks Through Autonomously Scheduled TSCH," Proceedings of the 13th ACM Conference on Embedded Networked Sensor Systems, ACM, 2015, pp. 14.
T. Winter, et al. Rpl: Ipv6 Routing Protocol for Low-Power and Lossy Networks, (rfc 6550), http://www.ietf.org/rfc/rfc6550.txt, 2070-1721, Mar. 2012, pp. 157.

* cited by examiner

NETWORK DEVICE AND METHOD FOR WIRELESS LOCAL AREA NETWORK SCHEDULING

FIELD

The present disclosure relates to network devices and methods, specifically network devices and methods for providing a wireless local area network schedule.

BACKGROUND

The latest IETF 6TiSCH (IPv6 over Time Synchronized Channel Hopping (TSCH) MAC) standard is considered by many as the de-facto technique for wireless industrial applications, which can offer high communication reliability and low latency by enabling deterministic wireless communication and optimally schedule radio resources among network devices.

In a wireless network, TSCH technology divides the wireless bandwidth into time and frequency and neighbouring wireless network devices (or "nodes") can communicate (i.e. transmit and/or receive data) during a timeslot over a specific bandwidth (also referred to herein as a frequency channel). A Time Division Multiple Access (TDMA) schedule determines during which timeslot and over which frequency channel a network device should transmit or receive data to/from its neighbours.

The majority of existing scheduling algorithms only address uplink scheduling problems—that is, data to be communicated from distal nodes towards the central hub, or "root node". However, downlink data—that is, data to be communicated in a direction from the root node towards the distal nodes—is necessary for many industrial applications, for example, sending control messages, querying and reconfiguring network devices and upgrading device firmware. It would therefore be desirable to provide a method and network device for producing schedules which adequately provides for both uplink and downlink data.

Furthermore, many current scheduling algorithms are suitable only for use with small scale networks. This is due to the overflow of a node buffer—that is a exceeding of a limitation on the amount of data a single network device can store. This is often caused by nodes closer to the central hub, or root node, needing to relay data from more distal nodes. This means that the more central nodes need to receive and store data from other nodes, before transmitting it on to the next node. Many scheduling algorithms result in a centrally-located node receiving a large amount of data before being able to transmit it on and this can overflow the buffer, resulting in lost data or malfunction of the wireless local area network. It would therefore also be desirable to provide a method which minimises the amount of data which needs to be stored at individual nodes at any one time.

Existing scheduling algorithms will typically be undertaken centrally. A centralised scheduler will require data communication requirements from all of the nodes in a network and will then prepare a schedule for transmission of all of the network data, attempting to avoid collisions and interference. This process can be complex and time consuming. Distributed scheduling schemes alleviate the problems associated with centralised systems, by making local and thus quicker scheduling decisions. Known distributed scheduling schemes build a schedule in a sequential manner starting from the most distal nodes and working towards the root node. Such schemes often take a long time to start-up when the network size is large. A scheduler is sought which can overcome these disadvantages.

DETAILED DESCRIPTION

Figure 1:
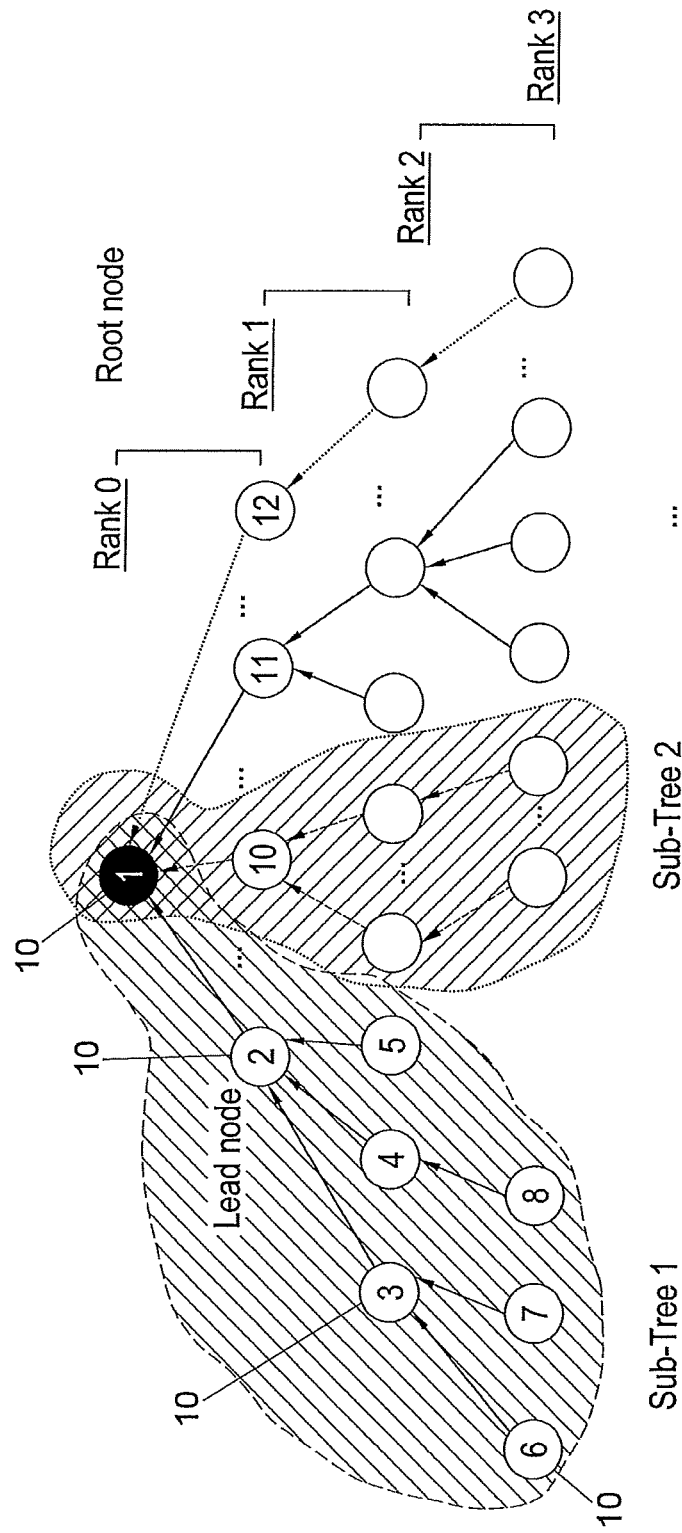
FIG. 1 is a schematic illustration of a wireless local area network.

According to the present disclosure is a network device for a wireless local area network. The network device may be operable to wirelessly communicate with a neighbouring device according to a schedule which allocates timeslots to communication between neighbouring devices. The network device may comprise:
  a wireless receiver, which may be operable to receive a request from a child neighbouring device for at least one timeslot for communicating a first amount of data to the network device. The network device may also comprise:
  a processor, which may be configured to allocate timeslots in a schedule to communication between the network device and the child neighbouring device.

The number of allocated timeslots may be greater than the minimum number of timeslots required to communicate the first amount of data.

A first one of the allocated timeslots may be an uplink timeslot in which the network device may be scheduled to receive data from the child neighbouring device.

A second one of the allocated timeslots may be a common timeslot which may be selectively operable as an uplink timeslot in which the network device may be scheduled to receive data from the child neighbouring device, or a downlink timeslot in which the network device may be scheduled to transmit data to the child neighbouring device.

The network device may further comprise:

a wireless transmitter, which may be operable to transmit the schedule to the child neighbouring device.

A wireless local area network may comprise a plurality of network devices (or "nodes"), each of which may be configured to communicate with other network devices in the network. A root node may be a hub, or data sink for the network.

A network device's location within the wireless local area network can be defined in terms of how many hops data must make to be transferred from the node in question to the root node. Network devices which communicate directly with the root node may be known as lead nodes and have a rank of 1. Network devices which communicate directly with the lead nodes are two hops way from the root node and may therefore be designated rank 2. This identification system can apply throughout the wireless local area network up to rank n nodes. The root node, lead node and all of the nodes which communicate data through that specific lead node may form part of a sub-tree. A network device may be unable to transmit and receive at the same time.

A neighbouring network device is a second network device with which a first network device can communicate (i.e. transmit data to and receive data from). A neighbouring network device which is located one hop closer to the root node (and hence is one rank lower) than a first network device may be a "parent neighbouring device" to the first network device, or a "parent node". A neighbouring network device which is located one hop further away from the root node (and hence is one rank higher) than a first network device may be a "child neighbouring device" to the first network device, or a "child node". During uplink communication, a network device may receive data from its child neighbouring device and/or transmit data to its parent neighbouring device. During downlink communication, a network device may receive data from its parent neighbouring device and/or transmit data to its child neighbouring device.

The network device may be for use in a Time-slotted Channel Hopping (TSCH) MAC system. The network device may be configured to communicate with other network devices according to MAC protocols, in particular TSCH MAC protocols. The network device may therefore be a TSCH MAC compliant device.

The network devices of a wireless local area network may be configured to transmit and/or receive data during specific time periods (known as timeslots). The network device may be operable to wirelessly communicate with a neighbouring device over at least one frequency channel. The network device may be configured to wirelessly communicate over a specific frequency range (known as a channel) in accordance with a schedule. A channel, or frequency channels, is a specific range of frequencies over which the wireless device can communicate. Channels may be delineated to avoid interference between pairs of network devices communicating on neighbouring channels.

The network device may be configured to allocate timeslots for communication with its neighbouring nodes. The network device may be a root node, a lead node or any other node of the network. The network device may be a parent and/or a child to a further network device. In this way, a distributed, decentralised algorithm may be provided.

In a distributed or decentralised scheduling system a plurality of schedules, each dealing only with communications relating to a specific network device may be provided. As such, a single, centralised schedule may not be provided. Instead, each network device may comprise a schedule for its communication behaviour. Each network device may be configured to receive a schedule from a parent network device and transmit a schedule to a child network device. Each network device may coordinate its communication behaviour with neighbouring network devices; a network device may not directly coordinate its communication behaviour with network devices with which it does not communicate.

The network device may be operable as part of a wireless local area network. The network device may be operable to wirelessly communicate with a neighbouring device over at least one frequency channel according to a schedule which allocates timeslots to communication between neighbouring devices.

The network device may comprise a processor configured to undertake a method as described anywhere herein. The method may include any steps which a processor or network device is described herein as being configured to undertake.

The network device may comprise a database or data storage unit comprising computer-readable instructions. The processor may be configured to operate as described herein when executing the computer readable instructions.

The network device may comprise a transmitter and a receiver. The network device may comprise a transceiver.

The processor may be configured to operate the transmitter and receiver. As such, the processor may be configured to transmit anything which the transmitter is operable to transmit and the processor may be configured to receive anything which the receiver is operable to receive. Similarly, the transmitter/receiver may be operable to transmit/receive anything that the processor is configured to transmit/receive.

Where it is said that the network device is scheduled to transmit or receive data, this may be understood to mean that the processor is configured to transmit or receive data.

Upon initialisation of the wireless local area network, a tree topology may be derived. The structure of the network may be plotted using a known routing protocol such as the Routing Protocol for Low-power and Lossy Networks (RPL) as standardised by the Internet Engineering Task Force. A wireless receiver may be operable to receive a network tree topology and/or the structure of the network.

A processor may be configured to receive a request from a child neighbouring device for a first number of timeslots. The first number of timeslots may be suitable for communicating the first amount of data.

The processor may be configured to allocate a second number of timeslots to communication between the network device and the child neighbouring device. The second number of timeslots may be greater than the first number of timeslots. The second number of timeslots may be twice as large as the first number of timeslots. The processor may also be configured to allocate the child neighbouring device a further group of timeslots as "free timeslots", which are not allocated to communication between the network device and the child neighbouring device.

The minimum number of timeslots required to communicate the first amount of data may be equal to the number of data packets which need to be transmitted by the child neighbouring device.

A first one of the allocated timeslots may be an uplink timeslot. The processor may be configured to receive data from the child neighbouring device in a first one of the allocated timeslots. A second one of the allocated timeslots may be a common timeslot. A common timeslot may be used by the network device as an uplink or downlink timeslot. The processor may be configured to selectively transmit data to or receive data from the child neighbouring device in a second one of the allocated timeslots.

It is to be understood that the terms "first one of the allocated timeslots" and "second one of the allocated timeslots" does not impart any specific order on the uplink and common timeslot. The uplink and common timeslots may be arranged in any order. Alternatively, the uplink timeslot may be provided first in the schedule—i.e. in an earlier timeslot than the common timeslot. Alternatively, the common timeslot may be provided first in the schedule—i.e. in an earlier timeslot than the uplink timeslot.

The wireless transmitter may be operable to transmit the schedule with the allocated timeslots (both uplink and common timeslots) to the child neighbouring device.

The network device may be further configured to communicate with (i.e. transmit data to or receive data from) a child neighbouring device during the allocated timeslots. The processor may be configured to communicate with a child neighbouring device according to the schedule. The wireless receiver may be operable to receive data during the allocated timeslots. The wireless transmitter may be operable to transmit data during the allocated timeslots.

The number of allocated timeslots may be twice the number of timeslots required to communicate the first amount of data to the network device.

Half of the allocated timeslots may be uplink timeslots in which the network device may be scheduled to receive data from the child neighbouring device.

Half of the allocated timeslots may be common timeslots which may be selectively operable as uplink timeslots in which the network device may be scheduled to receive data from the child neighbouring device, or downlink timeslots in which the network device may be scheduled to transmit data to the child neighbouring device.

Every second allocated timeslot may be an uplink timeslot. Every second allocated timeslot may be a common timeslot. The allocated timeslots may alternate between uplink and common timeslots.

The number of allocated timeslots may be twice the number of timeslots requested by the child neighbouring device. The allocated timeslots may be arranged to alternate between uplink timeslots and common timeslots such that a common timeslot follows every uplink timeslot. Accordingly, a first, third, fifth and any subsequent odd-numbered timeslot of the allocated timeslots may be an uplink timeslot and any even-numbered timeslot of the allocated timeslots may be a common timeslot.

The processor of a network device receiving the schedule may be configured to transmit data to a parent neighbouring device using the wireless transmitter in the half of the allocated timeslots that are uplink timeslots. The processor of a network device receiving the schedule may be configured to select either to transmit data to the parent neighbouring device using the wireless transmitter; or receive data from the parent neighbouring device using the wireless receiver; in the half of the allocated timeslots that are common timeslots.

The timeslots allocated to communication between the network device and the child neighbouring device may be arranged in the schedule such that a free timeslot immediately follows every timeslot allocated to communication between the network device and the child neighbouring device.

A free timeslot may be a timeslot not allocated to communication between the network device and the child neighbouring device.

The timeslots allocated to communication between the network device and the child neighbouring device in the schedule may be arranged such that a free timeslot is located between every pair of timeslots allocated to communication between the network device and the child neighbouring device.

In the schedule, the timeslots allocated to communication between the network device and the child neighbouring device may be arranged such that there is a space of at least one timeslot between every pair of timeslots allocated to the child neighbouring device.

Timeslots in the schedule may be sequentially numbered. The processor may be configured to allocate only odd-numbered timeslots to communication between the network device and the child neighbouring device or only even-numbered timeslots to communication between the network device and the child neighbouring device. The allocated odd-numbered or even-numbered timeslots may be sequential odd-numbered or even-numbered timeslots.

In a network device receiving the schedule, the receiver may be operable to receive a schedule arranged as described above.

The wireless transmitter may be operable to transmit a request for at least one timeslot to a parent neighbouring device.

The wireless receiver may be operable to receive a schedule from the parent neighbouring device which may allocate timeslots to communication between the network device and the parent neighbouring device.

The processor may be configured to allocate timeslots which are not allocated to communication between the network device and the parent neighbouring device to communication between the network device and the child neighbouring device Timeslots may be requested and received from a parent neighbouring device before a request is received from and timeslots are allocated to a child neighbouring device.

The request transmitted to the parent neighbouring node may be for at least one timeslot for communicating an amount (e.g. a second amount) of data from the network device to the parent neighbouring device. The request transmitted to the parent neighbouring node may be for a number (e.g. third number) of timeslots. The number of allocated timeslots in the schedule from the parent neighbouring device may be greater than the minimum number of timeslots required to communicate the second amount of data. The number of allocated timeslots in the schedule from the parent neighbouring device may be twice the minimum number of timeslots requested, or required to communicate the second amount of data.

Of the timeslots allocated by the parent neighbouring device to communication between the network device and the parent neighbouring device, a first one of the allocated timeslots may be an uplink timeslot (in which the network device may be scheduled to transmit data to the parent neighbouring device). A second one of the allocated timeslots may be a common timeslot (which may be selectively operable as an uplink timeslot in which the network device is scheduled to transmit data to the parent neighbouring device; or a downlink timeslot in which the network device is scheduled to receive data from the parent neighbouring device).

The processor may be configured to transmit data to the parent neighbouring device using the wireless transmitter in a first one of the allocated timeslots; and select either to: transmit data to the parent neighbouring device using the wireless transmitter in a second one of the allocated timeslots; or receive data from the parent neighbouring device using the wireless receiver in the second one of the allocated timeslots.

In the schedule received from the parent neighbouring device, the timeslots allocated to communication between the network device and the parent neighbouring device may be arranged in the schedule such that an empty timeslot immediately follows every timeslot allocated to communication between the network device and the parent neighbouring device. An empty timeslot may be a timeslot not allocated to communication between the network device and the parent neighbouring device.

The processor may be configured to allocate empty timeslots to communication between the network device and the child neighbouring device.

The processor may be configured to only allocate empty timeslots to communication between the network device and the child neighbouring device.

If a network device does not have enough timeslots not allocated to communication between the network device and the parent neighbouring device (e.g. empty timeslots) to allocate to a child neighbouring device, the network device may send a further request to the parent neighbouring device for more timeslots. The timeslots allocated by the parent neighbouring device to communication between the network device and the parent neighbouring device may be arranged in the schedule such that an empty timeslot immediately follows every timeslot allocated to communication between the network device and the parent neighbouring device. These empty timeslots may then be allocated to a child neighbouring device.

The timeslots allocated by the parent neighbouring device to communication between the network device and the parent neighbouring device may be arranged such that a timeslot not allocated to communication between the network device and the parent neighbouring device (e.g. an empty timeslot) is located between every pair of timeslots allocated to communication between the network device and the parent neighbouring device. That is, in the schedule from the parent neighbouring device, the timeslots allocated to communication between the network device and the parent neighbouring device may be arranged such that there is a space of at least one timeslot between every pair of timeslots allocated to communication between the network device and the parent neighbouring device.

The timeslots allocated to communication between the network device and the child neighbouring device are ones which are not allocated to communication between the network device and the parent neighbouring device.

The processor may be configured to add timeslots which are not allocated to communication between the network device and the parent neighbouring device to a list of empty timeslots (also referred to herein as a list of free timeslots). The list of empty timeslots may be stored in a data store or a data storage unit. The processor may be configured to allocate timeslots from the list of empty timeslots to communication between the network device and the child neighbouring device.

Accordingly, a network device may be configured to receive from a parent neighbouring device a schedule comprising spaced timeslots allocated to communication between the network device and the parent neighbouring device. The network device may be configured to allocate spaced timeslots to communication between the network device and the child neighbouring device such that the timeslots allocated by the network device interleave those allocated to the network device by the parent neighbouring device.

The timeslots allocated by the parent neighbouring device to communication between the network device and the parent neighbouring device may be on a first channel. The timeslots allocated to communication with a child neighbouring device may be on a second channel.

A different channel may be used for every hop, or two hops.

The value of a downlink parameter may determine whether the common timeslot is operable as an uplink timeslot or a downlink timeslot.

The value of a downlink parameter may determine whether the processor selects to transmit or receive data in a second one of the allocated timeslots.

Accordingly, when the downlink parameter is equal to a first value, the common timeslot may be operable as an uplink timeslot. When the downlink parameter is equal to a second value, the common timeslot may be operable as a downlink timeslot.

The common timeslot may be selectively operable as an uplink or downlink timeslot based on a downlink parameter. The common timeslot may be used as an uplink timeslot or a downlink timeslot based on a downlink parameter. The processor may be configured to select, or use, the common timeslot as an uplink timeslot or a downlink timeslot based on a downlink parameter. The common timeslot may be operable as an uplink timeslot when a downlink parameter is equal to or lower than a threshold value and as a downlink timeslot when the downlink parameter is equal to or greater than a threshold value. The threshold value may be 1.

As such, when a common timeslot allocated to communication between the network device and the parent neighbouring device is operable as a downlink timeslot, the network device may be scheduled and the processor may be configured to receive data from the parent neighbouring device. When a common timeslot allocated to communication between the network device and the child neighbouring device is operable as a downlink timeslot, the network device may be scheduled and the processor may be configured to transmit data to the child neighbouring device.

When a common timeslot allocated to communication between the network device and the parent neighbouring device is operable as an uplink timeslot, the network device may be scheduled and the processor may be configured to transmit data to the parent neighbouring device. When a common timeslot allocated to communication between the network device and the child neighbouring device is operable as an uplink timeslot, the network device may be scheduled and the processor may be configured to receive data from the child neighbouring device.

The network device may be configured to store the downlink parameter. The wireless receiver may be operable to receive the downlink parameter from the parent neighbouring device. The wireless transmitter may be operable to transmit a signal request to the parent neighbouring device. The wireless receiver may be operable to receive the downlink parameter from the parent neighbouring device in response to the signal request. The processor may be configured to store the downlink parameter in the storage unit. The wireless receiver may be operable to receiver a signal request from the child neighbouring device. The wireless transmitter may be operable to transmit the downlink parameter to the child neighbouring device in response to receiving the signal request from the child neighbouring device.

The wireless receiver may be operable to receive a downlink variable from a parent neighbouring device. The processor may be configured to calculate the downlink parameter based on the downlink variable.

The processor may be configured to calculate a downlink parameter based on a downlink variable received via the wireless receiver. The wireless transmitter may be operable to transmit a signal request to the parent neighbouring device. The wireless receiver may be operable to receive the downlink variable from the parent neighbouring device (for example in response to the signal request). The processor may be configured to calculate the downlink parameter based on the downlink variable. The processor may be configured to store the downlink variable and the downlink parameter in the storage unit. The wireless receiver may be operable to receive a signal request from the child neighbouring device. The wireless transmitter may be operable to transmit the downlink variable to the child neighbouring device in response to receiving the signal request from the child neighbouring device.

The downlink parameter may be determined such that it changes over time, for example as the slotframe cycle varies. The downlink parameter may be determined such that it changes value once the schedule has been implemented by the wireless network.

A slotframe cycle is a period of time equal to the total duration of the schedule and it counts the iteration number of the schedule. That is, a slotframe cycle is a period of time during which an entire cycle of data communication is undertaken within the wireless network.

The downlink parameter $P_{downlink}$ may be determined according to the following:

$$P_{downlink} = \begin{cases} 1 & K\%f_{downlink} = 0 \\ 0 & \text{otherwise} \end{cases}$$

Where K is the slotframe cycle number, % is the modulo operation and $f_{downlink}$ is the downlink variable.

The downlink parameter may be calculated as the modulo operation of the slotframe cycle number based on the downlink variable.

The downlink parameter may be updated between timeslots or slotframes. This may be achieved by receiving a replacement downlink parameter, or by receiving a replacement downlink variable and the processor determining a new downlink parameter from the new downlink variable. This provides a benefit of being able to adapt the schedule to suit the downlink communication requirements at the time.

The downlink parameter may alternate between two values. The downlink parameter may alternate values every 1, 2, 3, 4 or more than 4 slotframe cycles.

The downlink parameter or downlink variable may be set dependent on the amount of data to be communicated in a downlink direction. The root node of a wireless local area network may determine the downlink parameter or downlink variable.

The wireless receiver may be operable to receive a list assignation from a parent neighbouring device, which may assign the network device to one of a first and second list. The processor may be configured to set a channel, or plurality of channels, over which the network device communicates, based on the channel assignation.

All of the network devices of wireless local area network (except the root node) may be assigned to one of a first and a second list. Each list may comprise set channels over which network devices assigned to that list may communicate. A first channel, or first group of channels, may be allocated to the first list. A second channel, or second group of channels, may be allocated to the second list.

The wireless transmitter may be operable to transmit a signal request to the parent neighbouring device. The wireless receiver may be operable to receive a list assignation from the parent neighbouring device in response to the signal request. The storage unit may store the list assignation. The wireless receiver may be operable to receive a signal request from the child neighbouring device. The transmitter may be operable to transmit the list assignation to the child neighbouring device, for example in response to the signal request received from the child neighbouring device.

The root node may be configured to allocate lead nodes to the first or second list. Any node which is a child (direct or indirect) of a lead node is assigned to the same list as the lead node.

The wireless receiver may be operable to receive a signal request from the child neighbouring device.

The processor may be configured to assign the child neighbouring device to a first list or a second list.

Assigning the child neighbouring device to a first list or a second list may comprise:
  checking the number of timeslots that have been allocated by the network device to communication with neighbouring devices already assigned to the first list. It may also comprise:
  checking the number of timeslots that have been allocated by the network device to communication with neighbouring devices already assigned to the second list. It may also comprise:
  assigning the child neighbouring device to the list with the lower number of allocated timeslots.

If no timeslots have been allocated by the network device to communication with neighbouring devices already assigned to the first list or the second list, the processor may be configured to assign the child neighbouring device to the first list.

The processor may be configured and the transmitter may be operable to send the list to which the child neighbouring device has been assigned to the child neighbouring device in response to the signal request. The processor may be configured and the transmitter may be operable to send to the child neighbouring device a channel, or plurality of channels, over which the child neighbouring device must communicate in response to the signal request.

Timeslots in the schedule may be sequentially numbered.

The processor may be configured to allocate odd-numbered timeslots to communication between the network device and a child neighbouring device assigned to the first list and even-numbered timeslots to communication between the network device and a child neighbouring device assigned to the second list.

A root network device may be configured to interleave timeslots allocated to the two lists. A first list may therefore only be allocated odd-numbered timeslots and a second list may only be allocated even-numbered timeslots. The timeslots allocated to network devices of the two lists can then be combined into a single, complete schedule.

The wireless transmitter may be operable to transmit a request to a parent neighbouring device for at least one timeslot for communicating a first amount of data to the parent neighbouring device. The wireless receiver may be operable to receive a schedule from the parent neighbouring device which allocates timeslots to communication between the network device and the parent neighbouring device. The number of allocated timeslots may be greater than the minimum number of timeslots required to communicate the first amount of data to the parent neighbouring device. The processor may be configured to transmit data to the parent neighbouring device using the wireless transmitter in a first one of the allocated timeslots. The processor may be configured to selectively transmit data to the parent neighbouring device using the wireless transmitter in a second one of the allocated timeslots; or receive data from the parent neighbouring device using the wireless receiver in the second one of the allocated timeslots.

According to the disclosure is a network device for a wireless local area network. The network device may be operable to wirelessly communicate with a neighbouring device over at least one frequency channel according to a schedule which allocates timeslots to communication between neighbouring devices. The network device may comprise:
  a wireless transmitter, which may be operable to transmit a request to a parent neighbouring device which may be for at least one timeslot for communicating a first amount of data to the parent neighbouring device. The network device may further comprise:
  a wireless receiver, which may be operable to receive a schedule from the parent neighbouring device which may allocate timeslots to communication between the network device and the parent neighbouring device.
    The number of allocated timeslots may be greater than the minimum number of timeslots required to communicate the first amount of data to the parent neighbouring device.
The network device may further comprise a processor configured to:
  transmit data to the parent neighbouring device using the wireless transmitter in a first one of the allocated timeslots. The processor may further be configured to selectively:
  transmit data to the parent neighbouring device using the wireless transmitter in a second one of the allocated timeslots; or
  receive data from the parent neighbouring device using the wireless receiver in the second one of the allocated timeslots.

The network device may be further configured to communicate with (i.e. transmit data to or receive data from) a parent neighbouring device during the allocated timeslots. The wireless receiver may be operable to receive data during the allocated timeslots. The wireless transmitter may be operable to transmit data during the allocated timeslots.

Any discussion made herein relating to features of a network device applies, mutatis mutandis, to any example of a described network device.

The first one of the allocated timeslots may be an uplink timeslot. The second one of the allocated timeslot may be a common timeslot.

The wireless receiver may be operable to receive a request from a child neighbouring device for at least one timeslot for communicating a first amount of data to the network device. The processor may be configured to allocate timeslots in a schedule to communication between the network device and the child neighbouring device. The number of allocated timeslots may be greater than the minimum number of timeslots required to communicate the first amount of data. A first one of the allocated timeslots may be an uplink timeslot in which the network device is scheduled to receive data from the child neighbouring device. A second one of the allocated timeslots may be a common timeslot which is selectively operable as an uplink timeslot in which the network device is scheduled to receive data from the child neighbouring device, or a downlink timeslot in which the network device is scheduled to transmit data to the child neighbouring device. The wireless transmitter may be operable to transmit the schedule to the child neighbouring device.

According to the disclosure is a network device for a wireless local area network. The network device may be operable to wirelessly communicate with a neighbouring device according to a schedule which allocates timeslots to communication between neighbouring devices. The network device may be operable to wirelessly communicate over at least one frequency channel. The network device may comprise:
  a wireless receiver, which may be operable to receive a request from a child neighbouring device for timeslots. The network device may further comprise:
  a processor, which may be configured to allocate timeslots in a schedule to communication between the network device and the child neighbouring device.
    The timeslots allocated to communication between the network device and the child neighbouring device may be arranged in the schedule such that a free timeslot immediately follows every timeslot allocated to communication between the network device and the child neighbouring device.
    A free timeslot may be a timeslot not allocated to communication between the network device and the child neighbouring device.
  The network device may further comprise a wireless transmitter, which may be operable to transmit the schedule to the child neighbouring device.

The request may be for at least one timeslot for communicating a first amount of data to the network device.

The number of allocated timeslots may be greater than the minimum number of timeslots required to communicate the first amount of data to the network device. A first one of the allocated timeslots may be an uplink timeslot in which the network device is scheduled to receive data from the child neighbouring device. A second one of the allocated timeslots may be a common timeslot which may be selectively operable as an uplink timeslot in which the network device is scheduled to receive data from the child neighbouring device, or a downlink timeslot in which the network device is scheduled to transmit data to the child neighbouring device.

According to the present disclosure is a network device for a wireless local area network. The network device may be operable to wirelessly communicate with a neighbouring device according to a schedule which allocates timeslots to communication between neighbouring devices. The network device may be operable to wirelessly communicate with a neighbouring device over at least one frequency channel. The network device may comprise a wireless transmitter operable to transmit a request for timeslots to a parent neighbouring device. The wireless device may also comprise a wireless receiver operable to receive a schedule from the parent neighbouring device which allocates timeslots to communication between the network device and the parent neighbouring device. The timeslots allocated to communication between the network device and the child neighbouring device may be arranged in the schedule such that a free timeslot immediately follows every timeslot allocated to communication between the network device and the child neighbouring device. A free timeslot may be a timeslot not allocated to communication between the network device and the child neighbouring device.

The wireless transmitter may be operable to transmit a request to a parent neighbouring device for at least one timeslot for communicating a first amount of data to the parent neighbouring device. The wireless receiver operable to receive a schedule from the parent neighbouring device which allocates timeslots to communication between the network device and the parent neighbouring device. The number of allocated timeslots may be greater than the minimum number of timeslots required to communicate the first amount of data to the parent neighbouring device. The processor may be configured to transmit data to the parent neighbouring device using the wireless transmitter in a first one of the allocated timeslots. The processor may be configured to selectively: transmit data to the parent neighbouring device using the wireless transmitter in a second one of the allocated timeslots; or receive data from the parent neighbouring device using the wireless receiver in the second one of the allocated timeslots. The first one of the allocated timeslots may be an uplink timeslot. The second one of the allocated timeslot may be a common timeslot.

According to the disclosure is a method for defining a schedule for a wireless local area network. The wireless local area network may comprise a plurality of network devices. The schedule may allocate timeslots to communication between neighbouring network devices. The method may comprise:

a first network device transmitting a request to a second network device, which may be for at least one timeslot for communicating a first amount of data to the second network device. The method may further comprise:

A second network device allocating timeslots in a schedule to communication between the first network device and the second network device.

The number of allocated timeslots may be greater than the minimum number of timeslots required to communicate the first amount of data.

A first one of the allocated timeslots may be an uplink timeslot in which the second network device may be scheduled to receive data from the first network device.

A second one of the allocated timeslots may be a common timeslot which may be selectively operable as an uplink timeslot in which the second network device may be scheduled to receive data from the first network device, or a downlink timeslot in which the second network device may be scheduled to transmit data to the first network device.

The method may further comprise the second network device sending the schedule to the first network device.

The method may further comprise the first network device and the second network device communicating (i.e. transmitting and receiving data) during the allocated timeslots.

The number of allocated timeslots may be twice the number of timeslots required to communicate the first amount of data to the network device.

Half of the allocated timeslots may be uplink timeslots in which the network device may be scheduled to receive data from the child neighbouring device.

Half of the allocated timeslots may be common timeslots which may be selectively operable as uplink timeslots in which the network device may be scheduled to receive data from the child neighbouring device, or downlink timeslots in which the network device may be scheduled to transmit data to the child neighbouring device.

The timeslots allocated to communication between the first network device and the second network device may be arranged in the schedule such that a free timeslot immediately follows every timeslot allocated to communication between the first network device and the second network device.

A free timeslot may be a timeslot not allocated to communication between the first network device and the second network device.

The second network device may allocate timeslots which are not allocated to communication between the second network device and any other network device to communication between the first network device and the second network device.

The method may further comprise:

a third network device transmitting a request to the first network device, which may be for at least one timeslot for communicating a second amount of data to the first network device.

The method may further comprise the first network device allocating timeslots in a schedule which are not allocated to communication between the first network device and the second network device to communication between the first network device and the third network device.

The method may further comprise the first network device sending the schedule to the first network device.

The number of timeslots allocated by the first network device may be greater than the minimum number of timeslots required to communicate the second amount of data. A first one of the timeslots allocated by the first device may be an uplink timeslot in which the first network device is scheduled to receive data from the third network device. A second one of the timeslots allocated by the first network device is a common timeslot which is selectively operable as an uplink timeslot in which the first network device is scheduled to receive data from the third network device, or a downlink timeslot in which the first network device is scheduled to transmit data to the third network device.

The value of a downlink parameter may determine whether the common timeslot is operable as an uplink timeslot or a downlink timeslot.

The method may comprise the first network device using first one of the allocated timeslots as an uplink timeslot. The method may comprise the first network device using the common timeslot as an uplink timeslot when the downlink parameter is equal to a first value. The method may further comprise the first network device using the common timeslot as a downlink timeslot when the downlink parameter is not equal to a first value, or when the downlink parameter is equal to a second value.

The method may further comprise the first network device receiving a list assignation from the second network device, which may assign the first network device to one of a first and second list.

The method may further comprise the first network device setting a channel, or plurality of channels, over which the network device communicates, based on the channel assignation.

The method may further comprise:

the first network device transmitting a signal request to the second network device.

The method may further comprise the second network device receiving the signal request from the first network device.

The method may further comprise the second network device assigning the first network device to a first list or a second list.

Assigning the first network device to a first list or a second list may comprise at least one of, or all of:

checking the number of timeslots that have been allocated by the second network device to communication with neighbouring devices already assigned to the first list;

checking the number of timeslots that have been allocated by the second network device to communication with neighbouring devices already assigned to the second list; and assigning the first network device to the list with the lower number of allocated timeslots.

The method may further comprise sending the list assignation to the first network device.

Timeslots in the schedule may be sequentially numbered. The second network device may allocate odd-numbered timeslots or even numbered timeslots to the first network device depending on whether the first network device is assigned to the first or second list.

According to the disclosure is a method for defining a schedule for a wireless local area network comprising a plurality of network devices. The schedule may allocate timeslots to communication between neighbouring network devices. The method may comprise:

a first network device sending a request to a second network device for timeslots.

The method may further comprise the second network device allocating timeslots in a schedule to communication with the first network device.

The allocated timeslots may be arranged in the schedule such that a free timeslot immediately follows every timeslot allocated to communication between the first network device and the second network device.

A free timeslot may be a timeslot not allocated to communication between the first network device and the second network device.

The method may further comprise the second network device sending the schedule to the first network device.

A method according to the disclosure may comprise any features which a network device, processor, transmitter or receiver are described as being configured or operable to undertake. As such, any discussion made with respect to a network device according to the present disclosure applies, mutatis mutandis, to a method according to the disclosure.

According to the disclosure is a computer readable medium comprising instructions configured to undertake a method as disclosed anywhere herein.

The computer readable medium may be a non-transitory computer readable medium or a computer readable storage medium.

Further according to the disclosure is a wireless local area network comprising a network device as described anywhere herein. The wireless local area network may comprise a first network device and a second network device wherein the network devices are operable to wirelessly communicate according to a schedule which allocates timeslots to communication between neighbouring devices. The first network device and second network device may be configured to communicate wirelessly over at least one frequency channel. The first network device may be a parent neighbouring device and the second network device may be a child neighbouring device. The wireless local area network may be configured to undertake a method as described anywhere herein. The first network device and second network device of the wireless local area network may be configured to communicate (i.e. transmit/receive data) during the allocated timeslots.

FIG. 1 schematically shows a wireless local area network. The wireless local area network comprises a plurality of network devices 10, or nodes, each of which is configured to communicate with other network devices 10 in the network. A root network device/node ("1") is located at the top of the figure. All of the other network devices 10 in the network indirectly communicate data to the root node "1".

The arrows within FIG. 1 illustrate communication within the wireless local area network. A network device 10 can normally only communicate with a limited number of other network devices 10 within the network due to physical limitations such as separation. Typically, the majority of data is communicated from the network devices to the root node "1"—that is, uplink communications, as shown by the direction of the arrows. Examples of such communications include the transfer of sensor readings in an industrial monitoring network. In many networks, however, data will need to be transferred from the root node "1" to the other network devices in the wireless local area network and as such data will need to be communicated in a direction opposite to the arrows shown—downlink communications. Examples of such communications include sending control messages, querying and reconfiguring network devices, upgrading device firmware etc.

A network device's location within the wireless local area network can be defined in terms of how many hops data must make to be transferred from the node in question to the root node "1". Network devices 10 which communicate directly with the root node "1" (for example network devices "2", "10", "11" and "12") are known as lead nodes and have a rank of 1. Network devices 10 which communicate directly with the lead nodes (e.g. "3", "4" and "5") are two hops way from the root node "1" and are therefore rank 2.

This identification system can apply throughout the wireless local area network up to rank n nodes. The root node, lead node and all of the nodes which communicate data through that specific lead node form part of a sub-tree. For example, nodes "1" to "8" form sub-tree 1. The term "link" may be used to describe a specific hop or communication connection between two network devices—for example, the link between nodes "2" and "3" across which data is transferred from node "2" to node "3". A network device 10 is typically unable to transmit and receive at the same time.

A neighbouring network device is a second network device with which a first network device can communicate (i.e. transmit data to and receive data from). A neighbouring network device which is located one hop closer to the root node (and hence is one rank lower) than a first network device is a "parent neighbouring device" to the first network device, or a "parent node". A neighbouring network device which is located one hop further away from the root node (and hence is one rank higher) than a first network device is a "child neighbouring device" to the first network device, or a "child node". During uplink communication, a child network device transmits data to its parent network device. During downlink communication, a parent network device transmits data to its child network device.

The network devices are configured to transmit and/or receive data during specific time periods (known as timeslots) over a specific frequency range (known as a channel) in accordance with a schedule. In centralised scheduling systems, the root network device may determine the schedule and transmit it to the other network devices. In a decentralised system, each network device may be involved in preparing its own schedule and each network device may have its own schedule for its communications.

Figure 2:
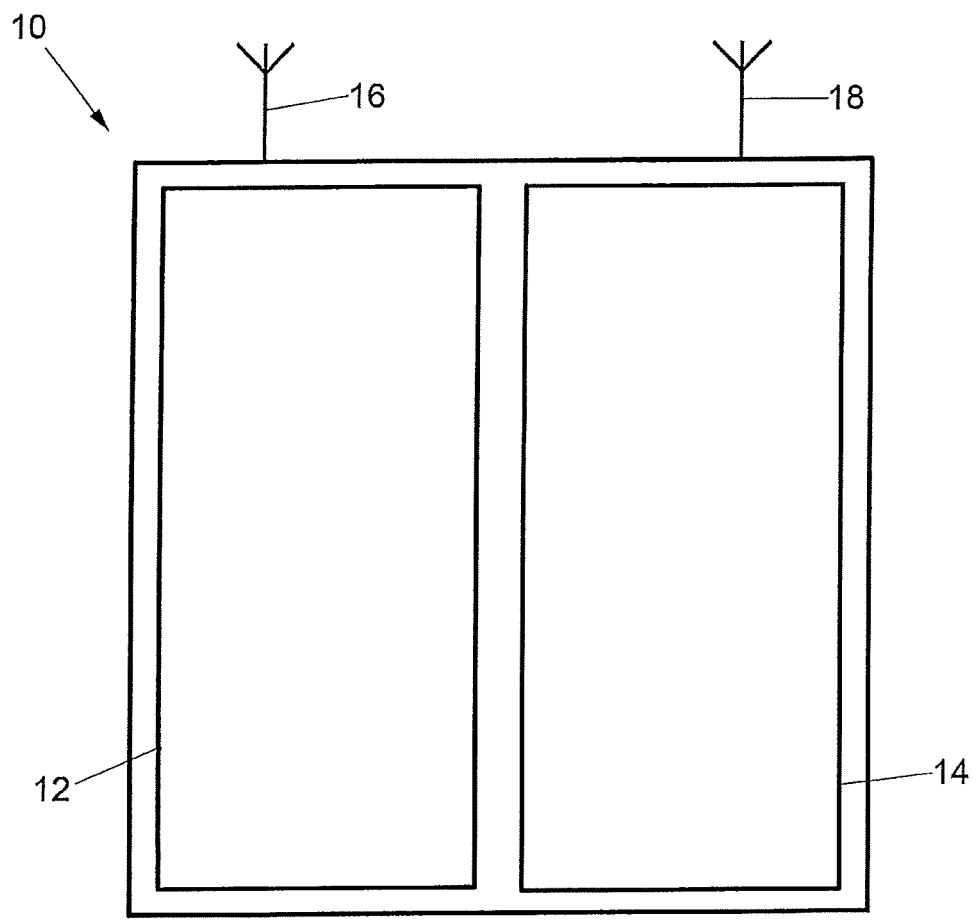
FIG. 2 is a schematic illustration of a network device according to the disclosure.

FIG. 2 is a schematic illustration of a network device 10 according to the present disclosure. The network device 10 comprises a processor 12, a data storage unit 14, a wireless receiver 16 and a wireless transmitter 18. The data storage unit 14 stores computer-readable instructions which, when executed by the processor 12, control operation of the network device 10. The processor 12 is configured to execute the computer-readable instructions and, when doing so, to control operation of the network device 10. The processor 12 is configured to operate the receiver 16 and transmitter 18. The receiver 16 and transmitter 18 comprise known components and are configured to receive data from a neighbouring network device 10 and transmit data to a neighbouring network device, respectively. In other network devices 10, the receiver and transmitter may be provided as a single transceiver.

Figure 3:
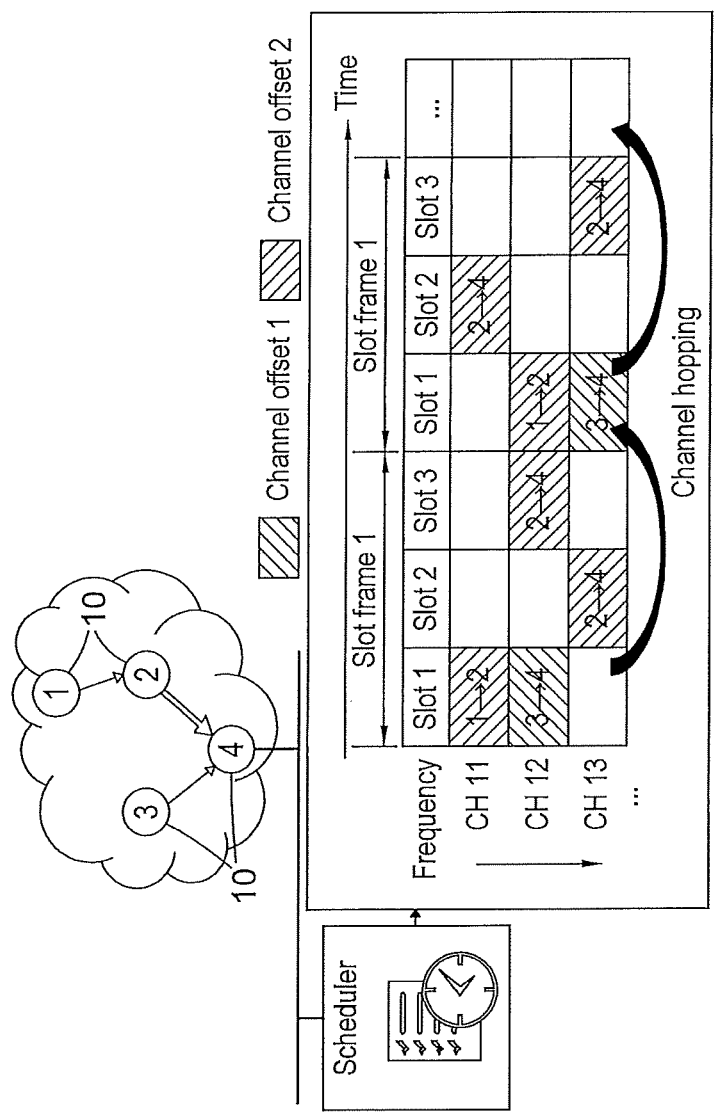
FIG. 3 shows a wireless local area network and example schedule produced using prior art methods.

FIG. 3 illustrates an example wireless local area network and an example schedule made in accordance with prior art methods. The wireless local area network has a centralised scheduler which provides a single schedule for the entire network. Network device "4" is the root node.

Links 1 to 2 and 3 to 4 are non-conflicting links as both can be used in the same timeslot because they do not involve any of the same network devices. Depending on the specifics of the network, a different channel may need to be used to avoid interference if these links are scheduled during the same timeslot. Links "1" to "2" and "2" to "4" are conflicting links because both use node "2" and node "2" cannot transmit and receive data at the same time. This means that these links must be assigned different timeslots.

An example centralised 6TiSCH schedule is illustrated in FIG. 3. The schedule specifies when data is transferred on each link and on what channel the data is transferred. The schedule takes into account the multi-hop nature of the network; that is, the schedule assigns link "2" to "4" a timeslot for transferring node "2"'s data packet, as well as a timeslot for passing on the data packet originating from node "1" to node "4".

Figure 4:
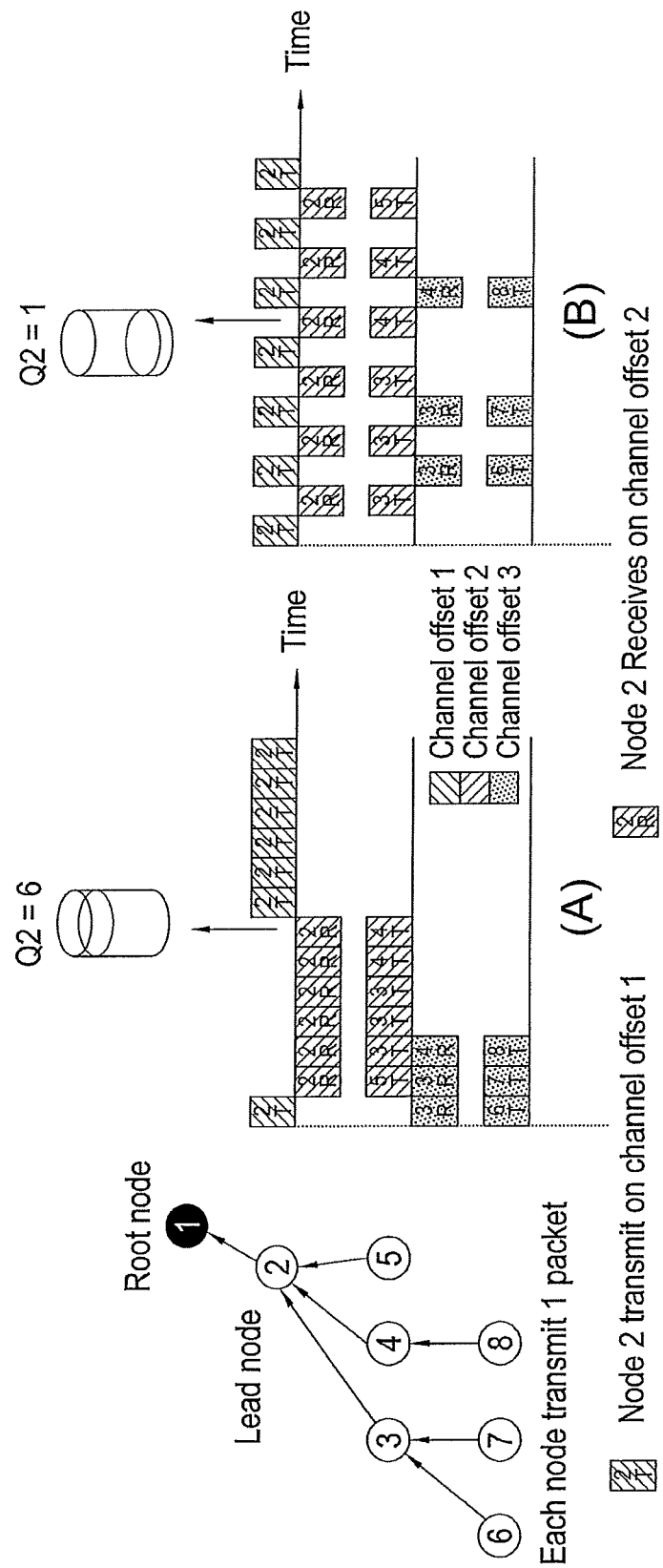
FIG. 4 shows part of the wireless local area network of FIG. 1 and two corresponding schedules.

FIG. 4 shows a sub-tree 1 of the wireless local area network of FIG. 1. FIG. 4 also schematically illustrates parts of two schedules for use with the illustrated part of the network. The illustrations of a schedule show when nodes of each rank transmit and receive data. A rectangle with "2R" in means that node "2" is receiving during the indicated timeslot. A rectangle with "3T" in means that node "3" is transmitting during the indicated timeslot. If the nodes are adjacent each other, the rectangles are located in the same timeslot and the shading is the same for each rectangle, it means that the two nodes are communicating (e.g. node "3" is transmitting to node "2").

For example, referring to the top row of schedule A, it can be seen that node "2" transmits in the first time slot ("2T") to node "1" (not shown in the schedule) and then receives for six timeslots in a row ("2R"). Node "2" first receives from node "5" ("5T"), then receives from node "3" three timeslots in a row ("3T"), then receives from node "4" for two timeslots in a row ("4T").

The data packet received by node "2" from node "5" is just the data of node "5", as node "5" does not have any child neighbouring devices. The three data packets received by node "2" from node "3" comprise the data packet of node "3" and the data from the child neighbouring devices of node "3": the packet of node "6" which is transferred from node "6" to node "3" during the first timeslot ("6T" "3R"); and the packet of node 7 which is transferred from node "7" to node "3" during the second timeslot ("7T" "3R"). The two data packets received by node "2" from node "4" comprise the data packet of node "4" and the data from the child neighbouring device of node "4": that is the data of node "8" which is transferred from node "8" to node "4" in the third timeslot ("8T" "4R").

As is shown in FIG. 4, the temporary buffer queue size of node "2"—that is the number of data packets which must be temporarily stored by node "2" at the same time—is equal to 6 at the end of the seventh timeslot. If the maximum data storage of node "2" was 5 data packets, for example, the data received during the seventh timeslot would not be stored and would be lost. This would then need to be retransmitted during a later timeslot and thus reduces the efficiency of the network communication as a whole.

Depending on the arrangement of the network, communication between neighbouring pairs of nodes may need to be done over different channels in order to avoid interference, as is illustrated in FIG. 4.

Schedule B illustrates a schedule for sub-tree 1 of the wireless network of FIG. 1, produced in accordance with principles of this disclosure. In schedule B, each node interleaves its transmitting timeslots with its receiving timeslots. Accordingly, when allocating timeslots to communication with a child neighbouring device, each network device arranges the allocated timeslots such that a timeslot not allocated to communication with a child neighbouring device is located between every pair of timeslots allocated to the child neighbouring device.

For example, node "1" allocates node "2" timeslots during which node "2" can communicate with node "1". When allocating node "2" timeslots, node "1" allocates timeslots such there is a timeslot gap between each allocated timeslot. This allows node "2" to allocate the 'timeslot gaps' to nodes "3", "4" and "5" for communication. This means that for all nodes except the root node, a node will typically alternate between communicating with a parent neighbouring device and a child neighbouring device.

The effect of the above is that a network device will typically transfer data to a parent neighbouring network device immediately before/after receiving data from a child network device. As such, a large buffer queue does not develop and there is no risk of data being dropped due to overfull data storage. The maximum queue size at network device "2" using schedule "B" is 1 data packet.

Looking now at the specifics of schedule B of FIG. 4, it can be seen that node "2" transmits to node "1" on every odd-numbered timeslot. On every even-numbered timeslot node "2" is receiving data from one of its child neighbouring devices. Similarly, the rank 2 network devices transmit on even-numbered timeslots and receive data on odd-numbered timeslots.

Figure 5:
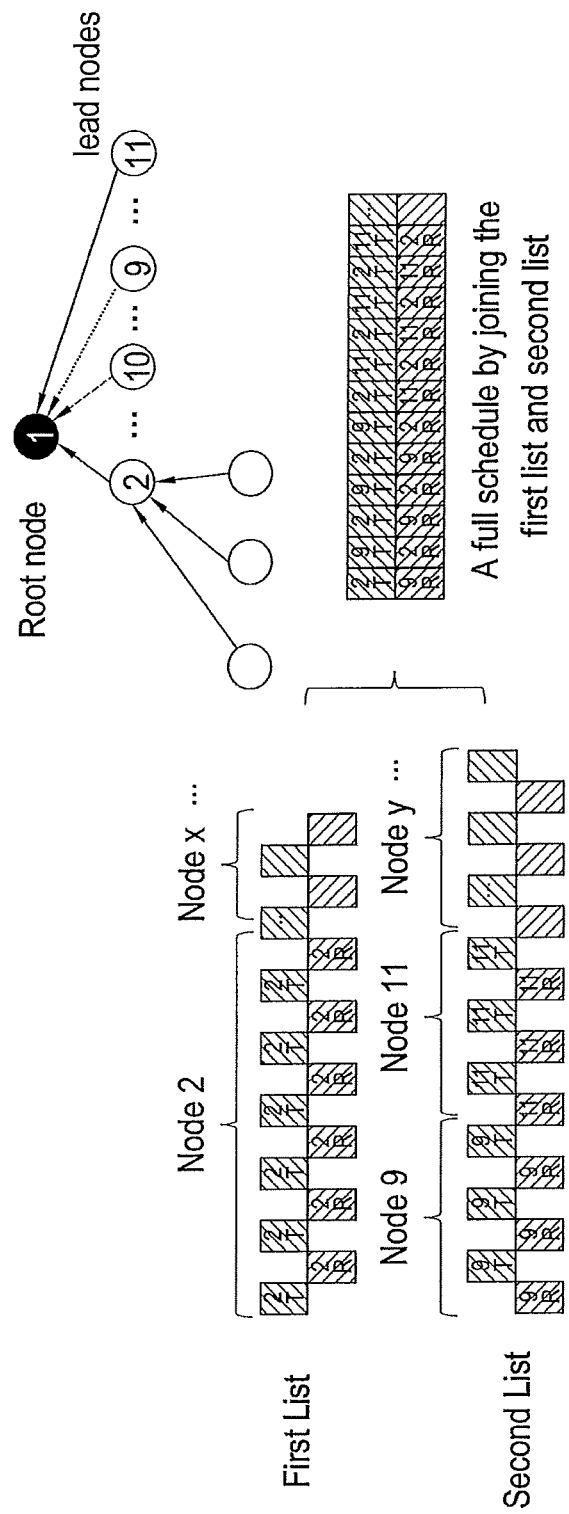
FIG. 5 shows part of the wireless local area network of FIG. 1 and two corresponding schedules.

FIG. 5 illustrates another element of the present disclosure. Lead nodes "2", "9", "10" and "11" of a wireless network communicate with the root node "1". The root node "1" assigns each of the lead nodes to a first list or a second list. Lead nodes assigned to the first list ("2", . . . ) are allocated odd-numbered timeslots to communicate with the root node "1". Lead nodes assigned to the second list ("9", "11", . . . ) are allocated even-numbered timeslots to communicate with the root node "1". The effect of this is that the root node will have a full schedule in which it alternately communicates with lead nodes of the first and second lists. Note that in the full schedule shown in FIG. 5, the transmitting nodes in the top row are on a different channel to the receiving nodes in the bottom row, since the nodes in the top row are transmitting to node "1" (not shown in the schedule) and the nodes in the bottom row are receiving from their respective child neighbouring nodes (also not shown in the schedule).

Figure 6:
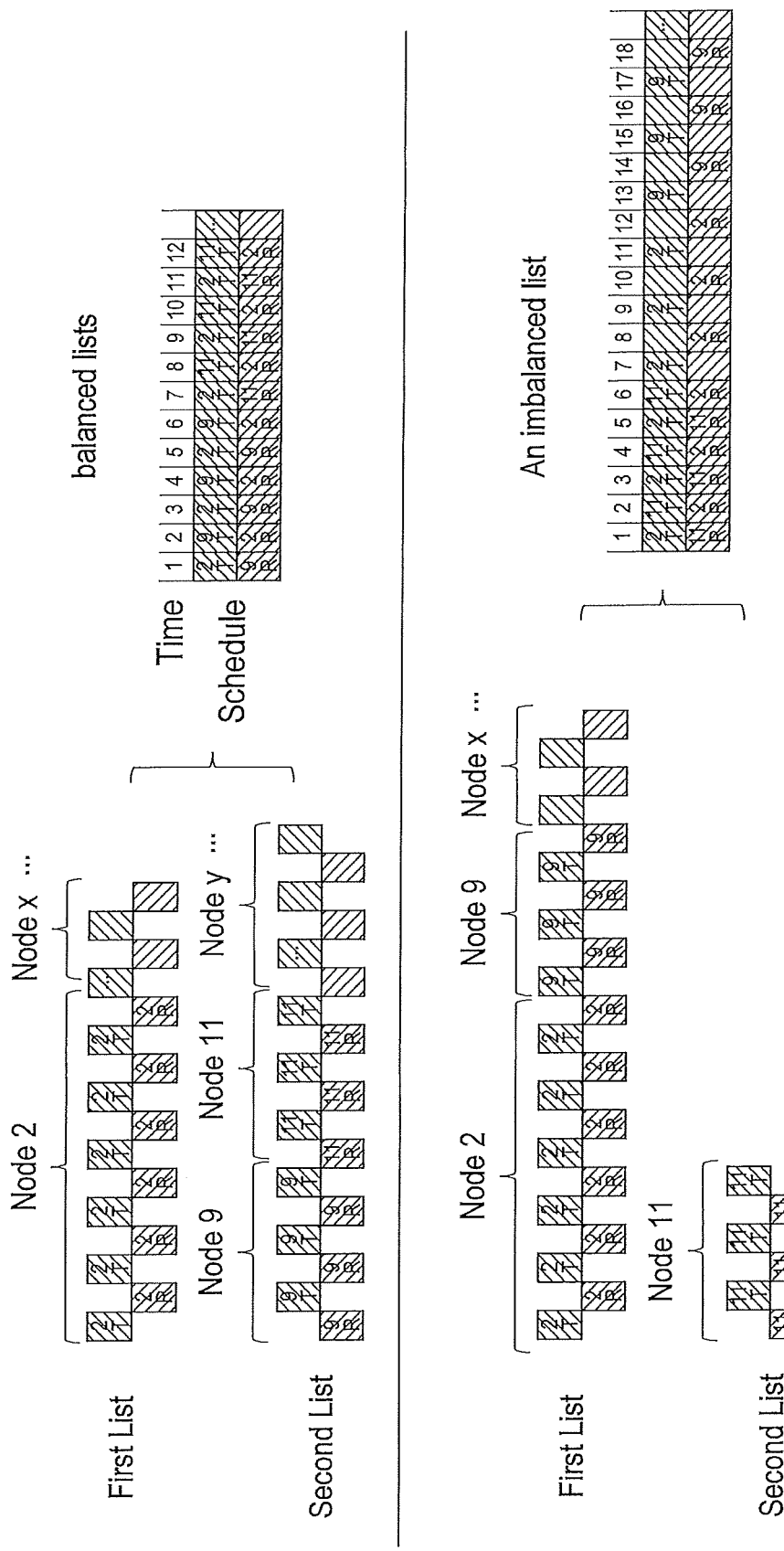
FIG. 6 shows part of a schedule for use with the wireless local area network of FIG. 1.

FIG. 6 illustrates how lead nodes may be assigned to the first or second list. In the top scheduling method, a greedy algorithm is used to determine to which list a lead node should be assigned. In doing so, the root node "1" compares the total number of timeslots already allocated to each of the lists and adds the next lead node to the list which has the lowest number of already allocated timeslots. This method provides more balanced lists, as shown in the top half of the figure. Balanced lists can be combined to provide the combined schedule shown in the top-right of FIG. 6. If the scheduling algorithm does not create balanced lists, the lead nodes of one of the lists may utilise more timeslots than those of the other list. When combining imbalanced lists, the schedule for node "1" is not full (i.e. there are timeslots in which node "1" is not being used). The schedule is also much longer. Accordingly, disadvantages of having an imbalanced, or only one, list is that resources are under-utilised and the schedule length is increased.

Figure 7:
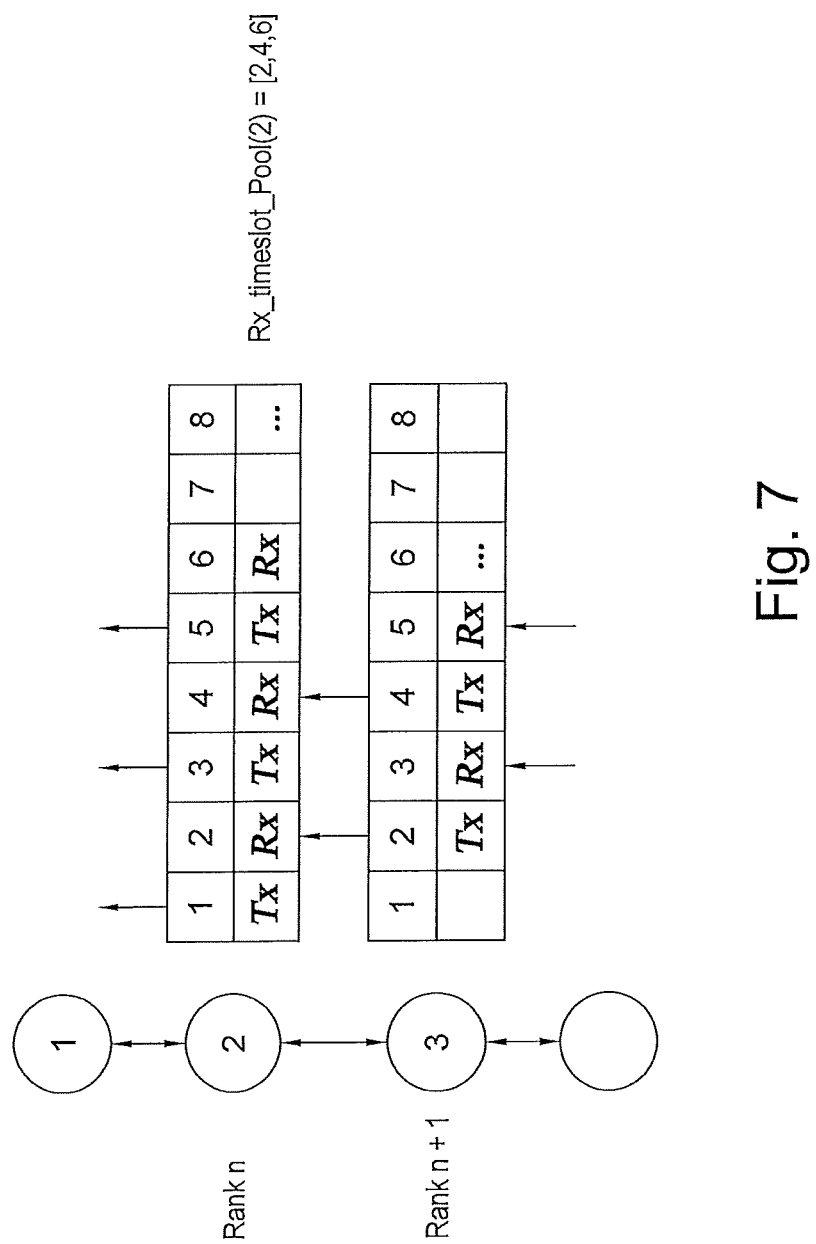
FIG. 7 shows exemplar schedules for network devices in a wireless local area network.

FIG. 7 illustrates how the schedules of neighbouring nodes may interact in a string of wireless network devices. As can be seen, node "1" is a parent neighbouring device of node "2" (which is of rank n). Node "3" is of rank n+1 and is a child neighbouring node of node "2". Looking at the schedule associated with node "2", it can be seen that it has been allocated timeslots 1, 3 and 5 to communicate with node "1"—in this case, node "2" is transferring data to node "1" in these timeslots. As timeslots 2, 4 and 6 are not allocated to communication with its parent neighbouring device, node "2" adds these timeslots to a list of free timeslots which can be allocated to communication with a neighbouring child device ("Rx_timeslot_Pool(2)"). Timeslots 2 and 4 are then allocated to communication with node "3". In this case, node "2" is configured to receive data from node "3" during these timeslots.

Looking now at the schedule of node "3", timeslots 2 and 4 have already been allocated as being for communication with node "2" (which is node "3"'s parent neighbouring node). Node "3" therefore adds timeslots 1, 3 and 5 to a list of unallocated/free timeslots ("Rx_timeslot_Pool(3)") and subsequently allocates timeslots 3 and 5 to communication with one of its child neighbouring devices, in which node "3" is receiving data. When neighbouring nodes are engaged in parallel communication (e.g. in timeslots 3 and 5 when node "2" is communicating with node "1" and node "3" is communicating with one of its child neighbouring nodes) it may be necessary to use different frequency channels (i.e. different channel offsets) to avoid interference.

Figure 8:
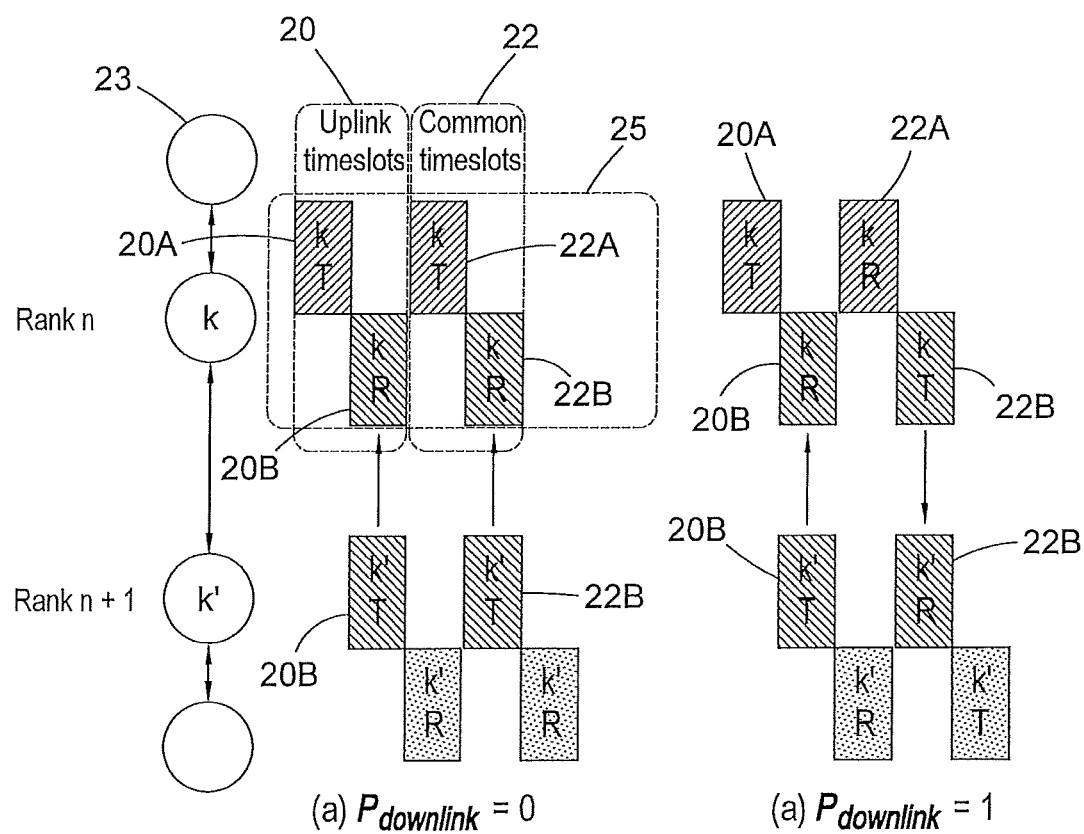
FIG. 8 shows exemplar schedules for network devices in a wireless local area network for two different downlink parameters.

FIG. 8 shows a method by which uplink and downlink communications can be provided for in a scheduling method. In order to provide a schedule in which uplink and downlink communication is sufficiently provided for, a network device allocates more timeslots to communication with a child neighbouring device than are required to transfer the known data. In the present example, a network device allocates two timeslots for every one timeslot requested. A first one of these timeslots is an uplink timeslot and is used to receive data from the child neighbouring device. The second allocated timeslot is a common timeslot and can be used as an uplink timeslot, to receive data from the child neighbouring device in the event that the child has further data to transfer (for example if communication during the first uplink timeslot failed), or alternatively, the common timeslot can be used as a downlink timeslot, in which data can be transferred by the network device to the child neighbouring device. Whether the common timeslot is used as an uplink timeslot or a downlink timeslot is determined by a downlink parameter $P_{downlink}$. If $P_{downlink}=0$, all of the common timeslots are used as uplink timeslots in which the child neighbouring device can transmit data. If $P_{downlink}=1$, all of the common timeslots are used as downlink timeslots in which the network device is configured to transfer data to the child neighbouring device.

Turning now to FIG. 8, network devices k and k' are shown. Network devices k and k' are part of a wider wireless network. Partial schedule is shown for network devices k and k'. With regard to the partial schedules of node k, uplink timeslots 20 are circled and subsequent common timeslots 22 are also circled. The total timeslots allocated (which may include uplink timeslots, common timeslots and—in some examples—free timeslots or empty timeslots for allocation to a subsequent child node) may be referred to as a "slot bundle" 25. The parent neighbouring device 23 of node k allocates an uplink timeslot 20A and a common timeslot 22A to node k. As discussed above, a network device allocating timeslots to a child neighbouring device allocates alternate timeslots—such that a timeslot not allocated to communication between the network device and the child neighbouring device is located between every pair of timeslots allocated to communication between the network device and the child neighbouring device. Accordingly, the parent 23 of node k allocates two timeslots 20A 22A to network device k, leaving a free timeslot between the allocated timeslots.

Network device k then allocates free timeslots 20B 22B to communication with its child neighbouring device, k'. A first of the timeslots 20B is an uplink timeslot and a second of the timeslots 22B is a common timeslot.

The first uplink timeslot 20A is used for node k to transfer data to its parent neighbouring device. The second uplink timeslot 20B is used for node k to receive data transferred from node k'. The first common timeslot 22A is used for uplink or downlink communication between node k and its parent neighbouring device 23. The second common timeslot 22B is used for uplink or downlink communication between node k and node k'.

When $P_{downlink}=0$, common timeslots are used as uplink timeslots. Accordingly, the first common timeslot 22A, allocated to node k by its parent node, is used as an uplink timeslot and so node k can use this timeslot 22A to transfer data to its parent neighbouring device—for example if the transfer during the first uplink timeslot 20A failed. Additionally, the second common timeslot 22B, allocated by node k for communication with its child node k' is also used as an uplink timeslot such that data can be transferred from node k' to node k.

When $P_{downlink}=1$, common timeslots are used as downlink timeslots. Accordingly, the first common timeslot 22A, allocated to node k by its parent node, is used as a downlink timeslot and so node k is configured to receive data transmitted by its parent neighbouring node 23 during this timeslot 22A. Similarly, the second common timeslot 22B, allocated by node k for communication with its child node k' is also used as a downlink timeslot such that data can be transferred from k to node k'.

Similar considerations apply to communication between node k' and its child node.

Figure 9:
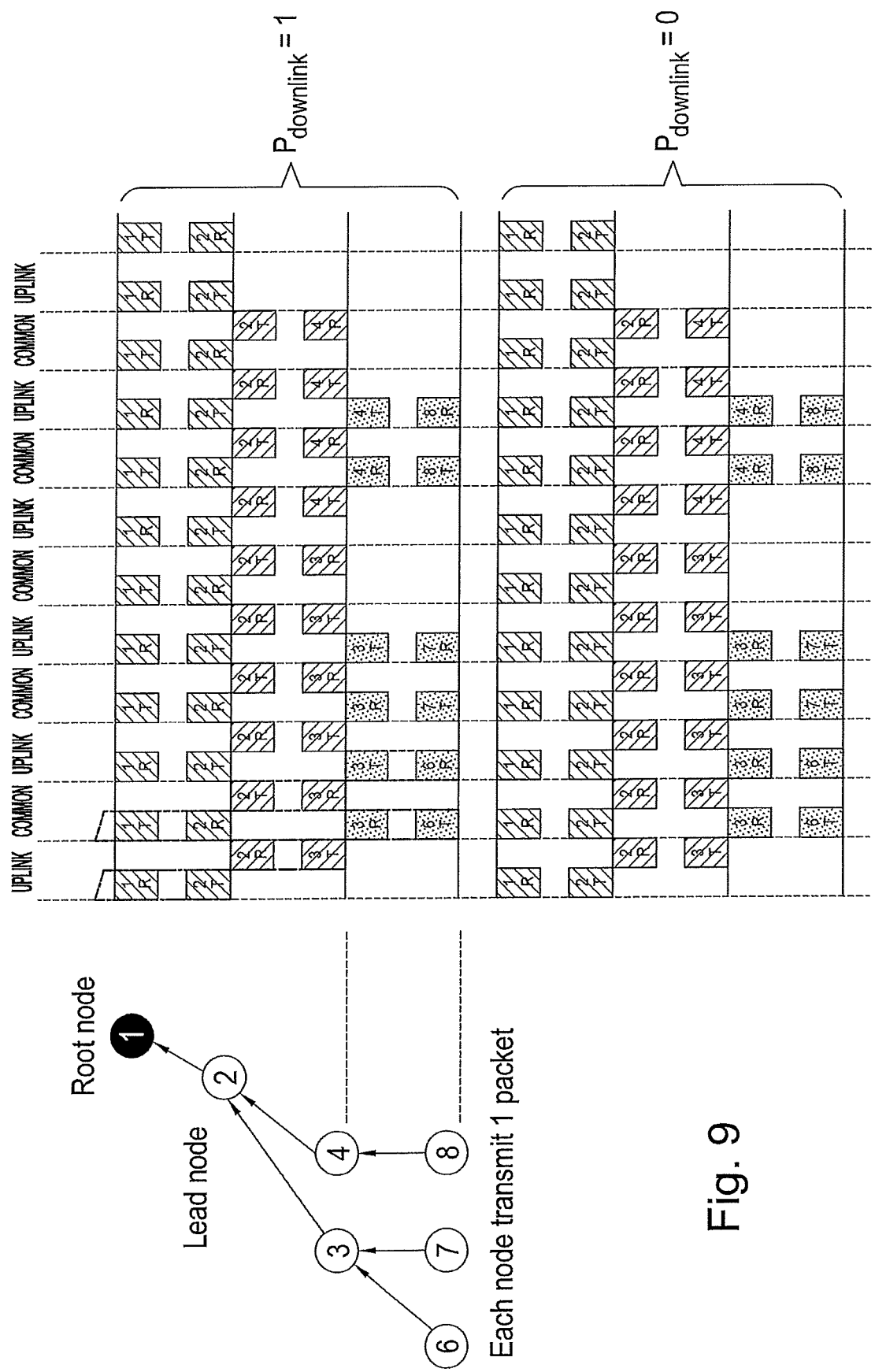
FIG. 9 shows part of the wireless local area network of FIG. 1 and corresponding schedules for two different downlink parameters.

FIG. 9 illustrates a part of a wireless network and corresponding schedules for four ranks of network devices. FIG. 9 illustrates schedules for when a downlink parameter is equal to both 1 and 0. As discussed above, common timeslots can be used for either uplink or downlink traffic, depending on the value of the downlink parameter. When $P_{downlink}=1$, common timeslots are operable as downlinks, when $P_{downlink}=0$, common timeslots are operable as uplinks.

$P_{downlink}$ is a downlink parameter which may be calculated by the root node and transmitted to all of the other nodes in the wireless network using the communication chains. Alternatively, the downlink parameter may be calculated by each node upon the provision of a network wide parameter, referred to herein as a downlink variable, from which it can be calculated. The downlink parameter may be updated (i.e. changed) between timeslots at any point during operation of the wireless network.

In the present example, $P_{downlink}$ is calculated by each network device based on a network wide parameter called the downlink variable according to the following:

$$P_{downlink} = \begin{cases} 1 & K\%f_{downlink} = 0 \\ 0 & \text{otherwise} \end{cases}$$

Where K is the slotframe cycle, % is the modulo operation and $f_{downlink}$ is the downlink variable.

The slotframe cycle number is based on the slotframe. The slotframe is the total number of timeslots in the schedule, i.e. the duration of a full cycle through the schedule. Once a full run through of the schedule has been completed, the slotframe has come to an end. When a second cycle of the schedule begins, the slotframe cycle becomes 2 and the schedule starts again.

The downlink variable $f_{downlink}$ is variable which is transmitted to all network devices by their respective parents. The downlink variable may be received or calculated by the root node and transmitted to the wireless network.

As can be seen, using the above equation to calculate the downlink parameter provides a downlink parameter which alternates between two different values depending on the slotframe cycle. This is useful as it can vary the number of downlink timeslots for every uplink timeslot. For example, the downlink variable can be selected such that the downlink parameter is calculated to ensure that the common timeslot is used as a downlink timeslot once for every 1, 2, 3, 4 or more than 4 times a common timeslot is used as an uplink timeslot.

Figure 10:
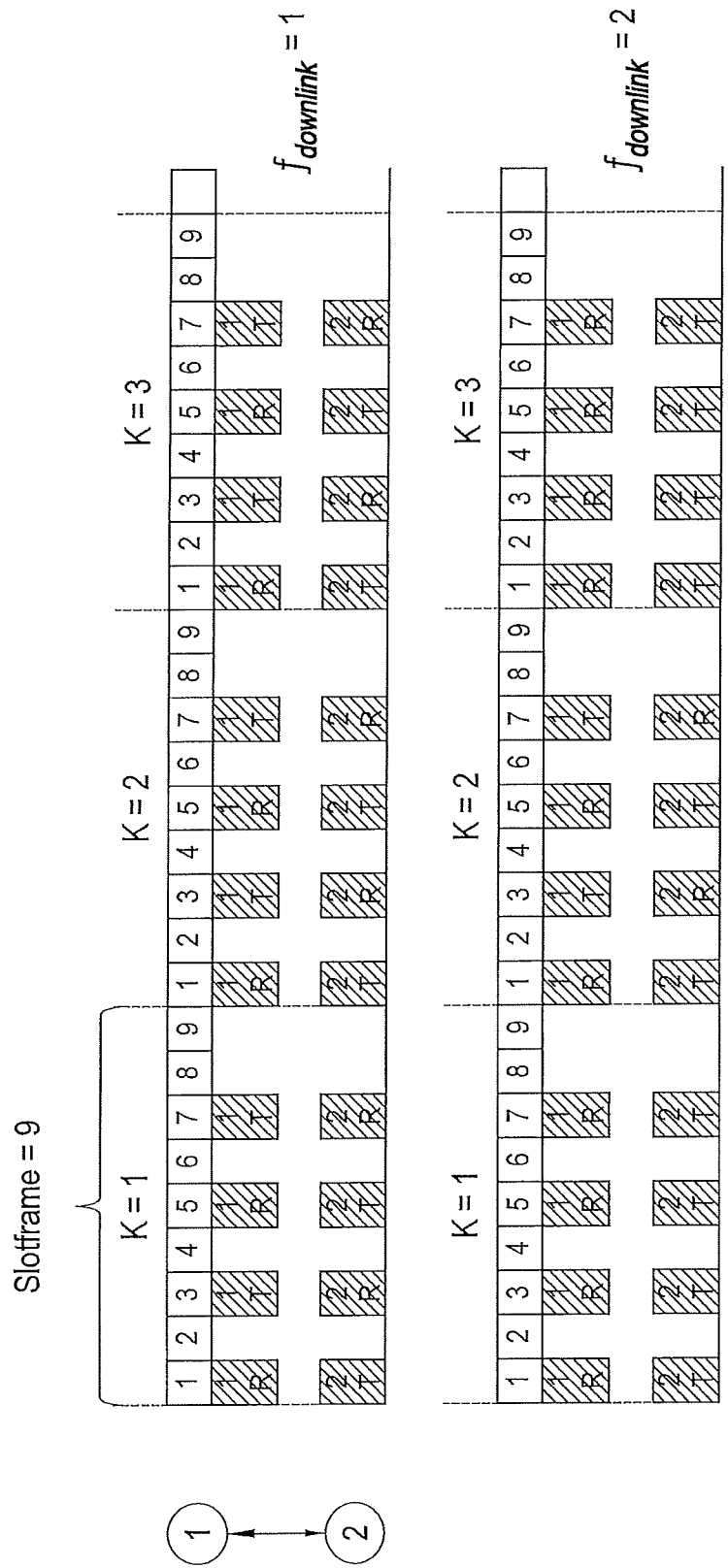
FIG. 10 shows schedules for two network devices for two different downlink variables.

FIG. 10 illustrates two exemplar schedules for communication between node "1" and node "2", based on two different downlink variables $f_{downlink}$. The schedules show three slotframe cycles. In the upper schedule, $f_{downlink}=1$ and so, using the above equation for calculating the downlink parameter, the downlink parameter $(P_{downlink})=1$ for every slotframe cycle and so all of the common timeslots are used as downlink timeslots. In the lower schedule, $f_{downlink}=2$ and so the downlink parameter $(P_{downlink})=1$ for every even slotframe cycle and 0 for every odd slotframe cycle. Accordingly, common timeslots are uplink timeslots in every odd slotframe cycle and downlink timeslots in every even slotframe cycle.

Figure 11:
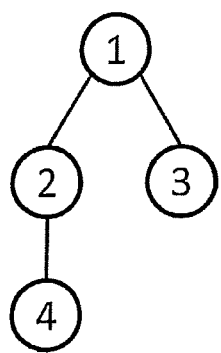
FIG. 11 is a schematic view of a wireless local area network.

An example of an algorithm for preparing a decentralised schedule as described herein will now be provided for the wireless local area network depicted in FIG. 11. It will be assumed that each of the network nodes "2", "3" and "4" needs to transmit one data packet (requiring 1 timeslot to transmit) to the root node.

Upon initialisation, a tree topology is derived and the structure of the network is plotted using a known routing protocol such as the Routing Protocol for Low-power and Lossy Networks (RPL) as standardised by the Internet Engineering Task Force. The rank 1 nodes ("2" and "3") are defined as lead nodes.

Node "2" transmits a signal request to node "1" and node "1" receives the signal request from node "2". Node "1" checks the number of timeslots that have been allocated to the first list and the second list. As node "2" is the first node to contact the root node ("1"), both lists are currently empty. Node "1" assigns node "2" to the first list by default. Node "1" then transmits a signal response including a list assignation to node "2". Node "2" stores the list assignation and selects certain channels on which it shall operate, based on the list assignation. The signal response also includes a downlink variable ($f_{downlink}$). Upon receiving the downlink variable, node "2" calculates a downlink parameter $P_{downlink}$.

Node "2" then sends an ADD request to node "1" and node "1" receives the request. The request is for two timeslots (one for transferring the data belonging to node "2" and one for passing on the data from node "4"). Node "1" checks which timeslots in its schedule are free and, as all timeslots are currently free and node "2" belongs to the second list, node "1" allocates two pairs of timeslots on odd-numbered timeslots. A first timeslot in each pair (timeslots 1 and 5) is an uplink timeslot for communication of data from node "2" to node "1" (indicated as "2→1" in the below table). A second timeslot in each pair (timeslots 3 and 7) is a common timeslot for use as an uplink or downlink timeslot depending on the value of the downlink parameter (indicated as "2-1" in the below table).

The schedule of node "1" is updated to reflect that these timeslots have been allocated. Now timeslots have been allocated to node "2", which has been assigned to the first list, the total number of allocated timeslots for the first list is updated.

Node "1" then transmits the schedule with the allocated timeslots to node "2". Once node "2" receives the schedule, it knows when it can transmit (uplink)/receive (downlink) to/from Node 1. A schedule at this stage is shown below in table 1.

TABLE 1

| Schedule for Node 2 | | | | | | | |
|---|---|---|---|---|---|---|---|
| Time 1 | Time 2 | Time 3 | Time 4 | Time 5 | Time 6 | Time 7 | Time 8 |
| 2 → 1 | | 2 - 1 | | 2 → 1 | | 2 - 1 | |

Node "2" adds the scheduled list of timeslots which have not been allocated (timeslots 2, 4, 6, 8) to its list of free timeslots, which now are available to be allocated to a child neighbouring node. Timeslots belonging to the same uplink-common timeslot pair (e.g. timeslots 2 and 4) must be assigned to the same child node.

When node "3" joins the network, the same procedures above are carried out. Node "3" sends a signal request to node "1". The number of timeslots allocated to nodes belonging to list 1 is now larger than those allocated to list 2. Node "3" is therefore assigned to list 2 and this is communicated to node "3" by node "1" in a list assignment. A downlink variable ($f_{downlink}$) is also sent to node "3". Upon receiving the downlink variable, node "3" calculates a downlink parameter $P_{downlink}$.

Node "3" stores the list assignation and the downlink parameter and sets which channels it will use in light of the list assignment (which list a node is assigned to determines which frequency channels it is configured to use). Node "3" will use different frequency channels to node "2", as nodes "2" and "3" are in different lists.

Node "3" then sends a request for 1 timeslot to node "1" and node "1" allocates timeslots 2 and 4 (which are currently free for node "1") to communication with node "3" and updates its schedule accordingly. Even numbered timeslots are allocated since node "3" is in the second list. Since node "3" and node "2" belong to different lists, different channels will be used for their respective communications (emboldened text in the following tables indicates a different frequency channel).

The first allocated timeslot (timeslot 2) is an uplink timeslot. The second allocated timeslot (timeslot 4) is a common timeslot. Table 2 indicates a schedule of node "1" for communication with nodes "2" and "3".

TABLE 2

| | Node "1" schedule for communication with node 2 and node 3 | | | | | | |
|---|---|---|---|---|---|---|---|
| Time 1 | Time 2 | Time 3 | Time 4 | Time 5 | Time 6 | Time 7 | Time 8 |
| 2 → 1 | 3 → 1 | 2 - 1 | 3 - 1 | 2 → 1 | | 2 - 1 | |

Finally, node "4" joins the network via node "2". Node "4" receives a list assignation from node "2" in response to a signal request being sent by node "4" to node "2" (all nodes which are associated with the same lead node are on the same list) assigning it to the first list and node "4" sets which channels it will operate on accordingly. Node "4" also receives the downlink variable and calculates the downlink parameter.

Node "4" then sends a request to node "2" for 1 timeslot for communicating its data. Node "2" checks its list of available timeslots (timeslots 2, 4, 6, 8) and allocates a pair of timeslots (timeslots 2 and 4) to communicating with node "4" and updates its schedule accordingly. Node "2" then transmits a schedule with the allocated timeslots (2 and 4) to node "4". Timeslot 2 is an uplink timeslot and timeslot 4 is a common timeslot.

If the number of timeslots requested by node "4" exceeds the number of free timeslots (i.e. timeslots which are not allocated to communication with node "1") that node "2" has node "2" transmits a request to node "1" to request further timeslots. Node "1" will then allocate further odd-numbered timeslots to communication with node "2". Node "2" will then add the intervening even-numbered timeslots to its list of free timeslots and these can then be allocated to node "4".

Table 3 shows a combined schedule for communication of all of the data in the network. Note that each node may only have a schedule for its respective communications and so, in practice, it may be that no node stores a combined schedule as shown below.

TABLE 3

| Time 1 | Time 2 | Time 3 | Time 4 | Time 5 | Time 6 | Time 7 | Time 8 |
|---|---|---|---|---|---|---|---|
| 2 → 1 | 3 → 1<br>4 → 2 | 2 - 1 | 3 - 1<br>4 - 2 | 2 → 1 | | 2 → 1 | |

As discussed above, whether the common timeslots will be used an uplink or downlink timeslot will depend on the downlink parameter ($P_{downlink}$). Table 4 shows the schedule with $P_{downlink}=0$ while Table 5 illustrates the schedule with $P_{downlink}=1$.

TABLE 4

| | Schedule with $P_{downlink} = 0$ | | | | | | |
|---|---|---|---|---|---|---|---|
| Time 1 | Time 2 | Time 3 | Time 4 | Time 5 | Time 6 | Time 7 | Time 8 |
| 2 → 1 | 3 → 1<br>4 → 2 | 2 → 1 | 3 → 1<br>4 → 2 | 2 → 1 | | 2 → 1 | |

TABLE 5

| | Schedule with $P_{downlink} = 1$ | | | | | | |
|---|---|---|---|---|---|---|---|
| Time 1 | Time 2 | Time 3 | Time 4 | Time 5 | Time 6 | Time 7 | Time 8 |
| 2 → 1 | 3 → 1<br>4 → 2 | 1 → 2 | 1 → 3<br>2 → 4 | 2 → 1 | | 1 → 2 | |

Figure 12:
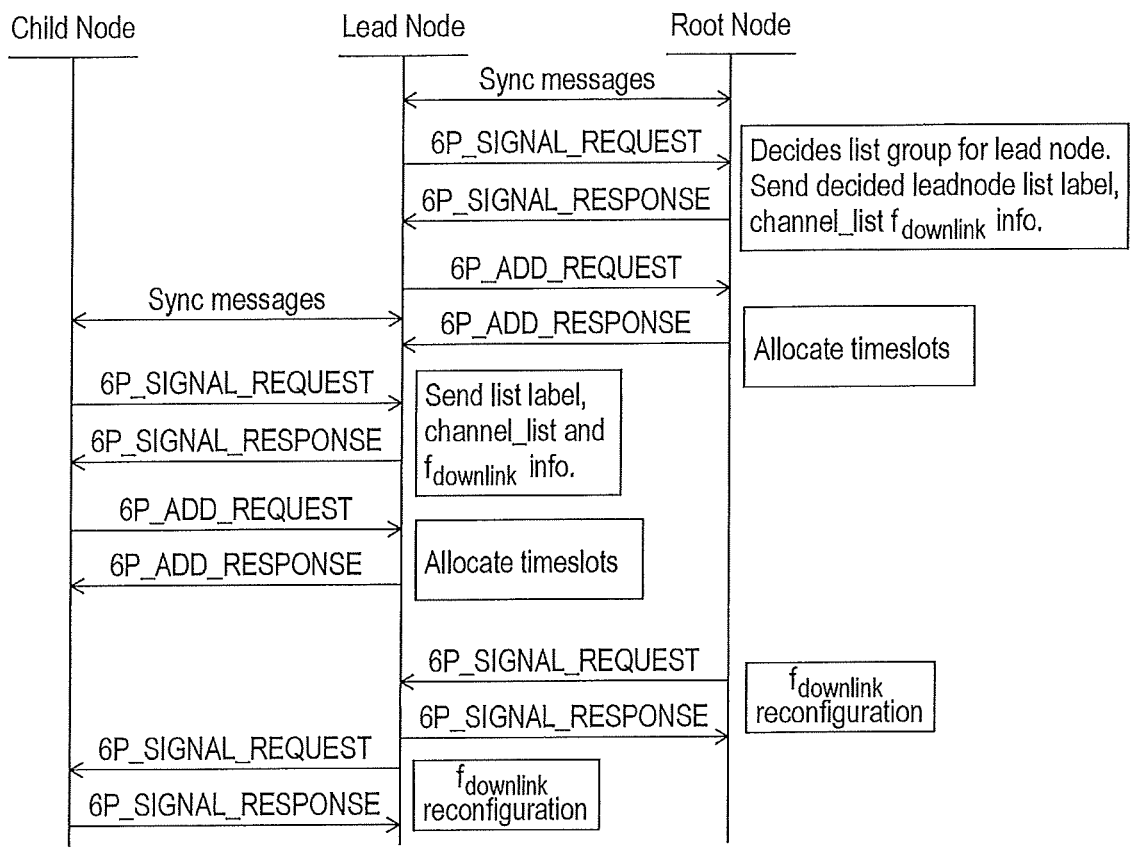
FIG. 12 schematically shows communication between three network devices according to the disclosure.
Figure 13:
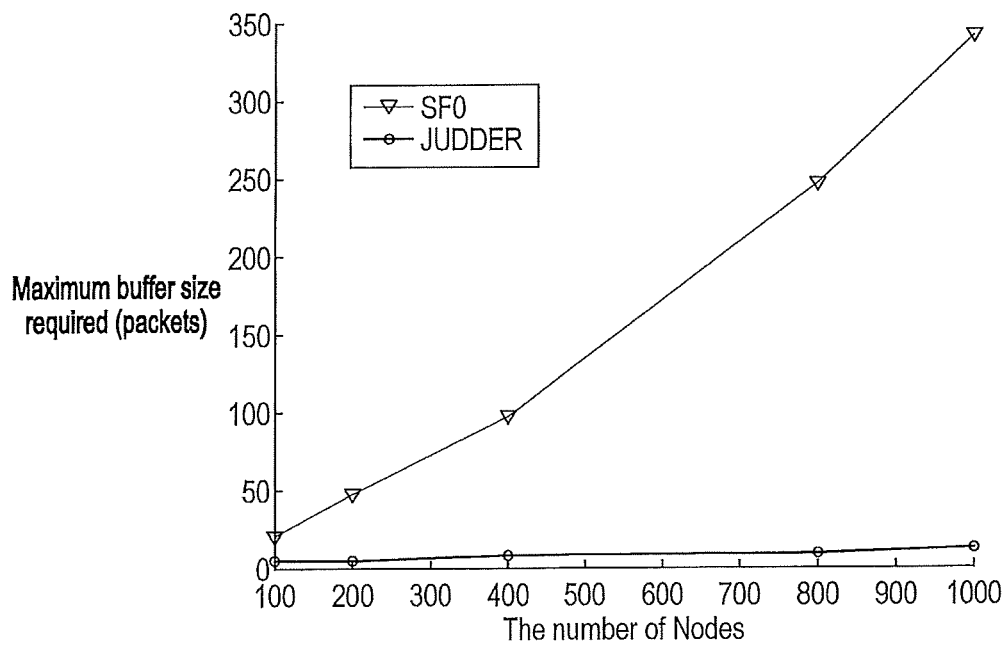
FIG. 13 is a graph comparing the maximum buffer size required for a range of the number of nodes in the wireless local area network for methods according to the disclosure compared to prior art methods.
Figure 14:
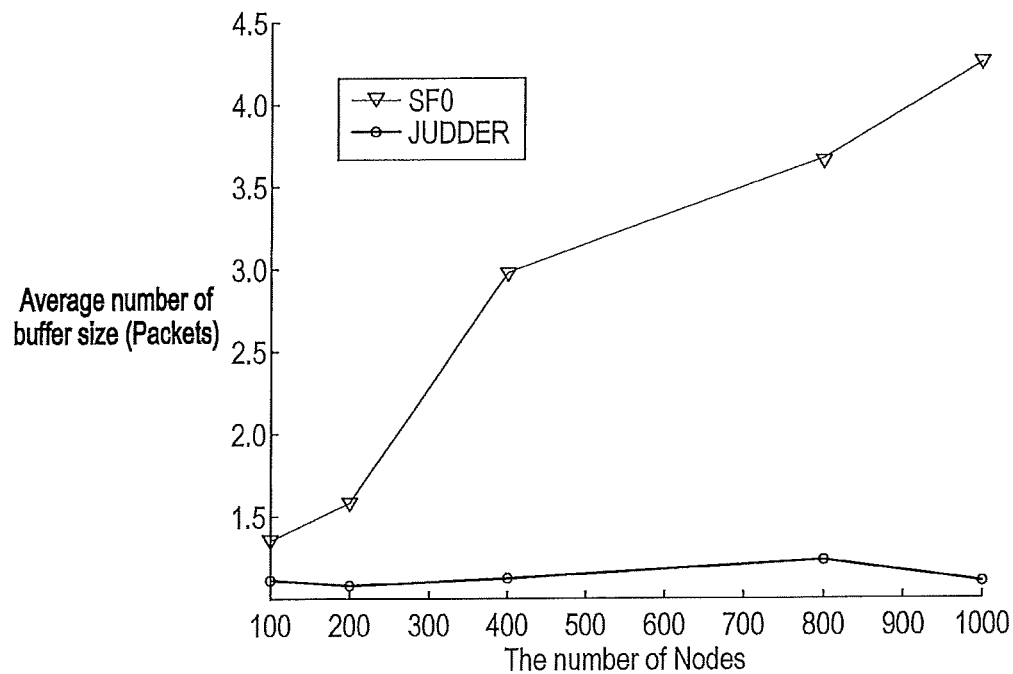
FIG. 14 is a graph comparing the average buffer size required in terms of the number of nodes in the wireless local area network for methods according to the disclosure compared to prior art methods.
Figure 15:
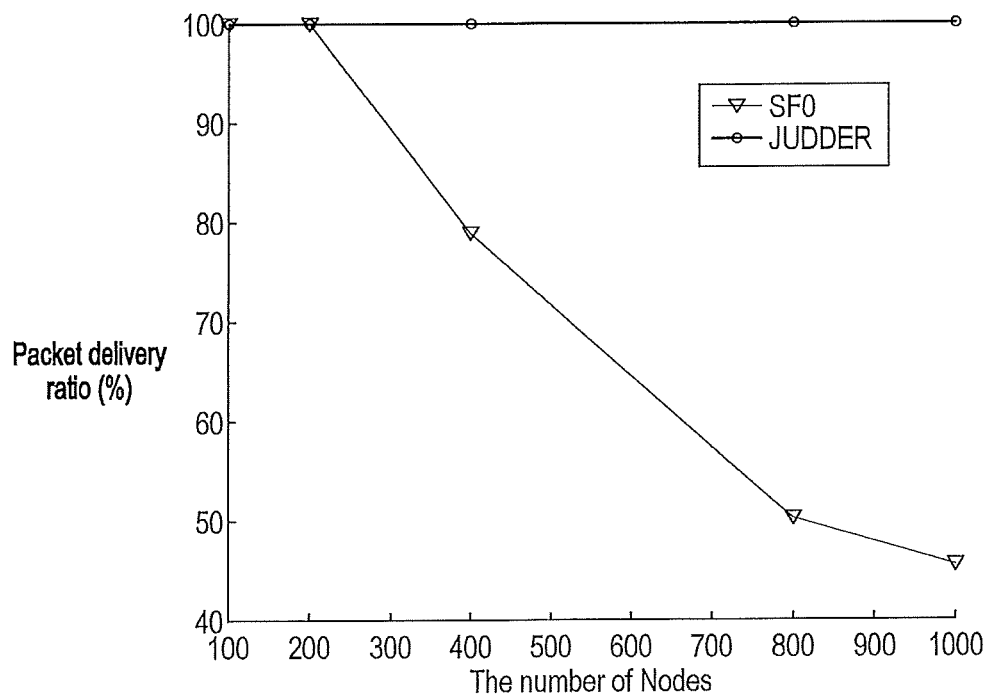
FIG. 15 is a graph comparing the packet delivery ratio in terms of the number of nodes in the wireless local area network for methods according to the disclosure compared to prior art methods.
Figure 16:
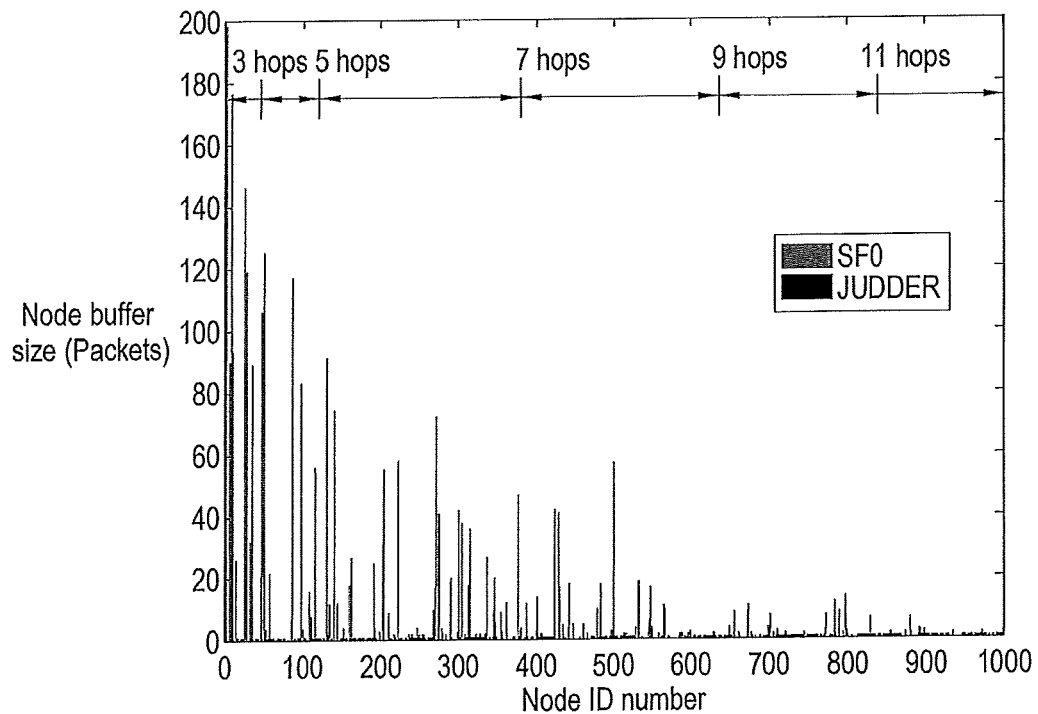
FIG. 16 is a graph comparing the node buffer size in terms of node ID number and the number of hops for methods according to the disclosure compared to prior art methods.
Figure 17:
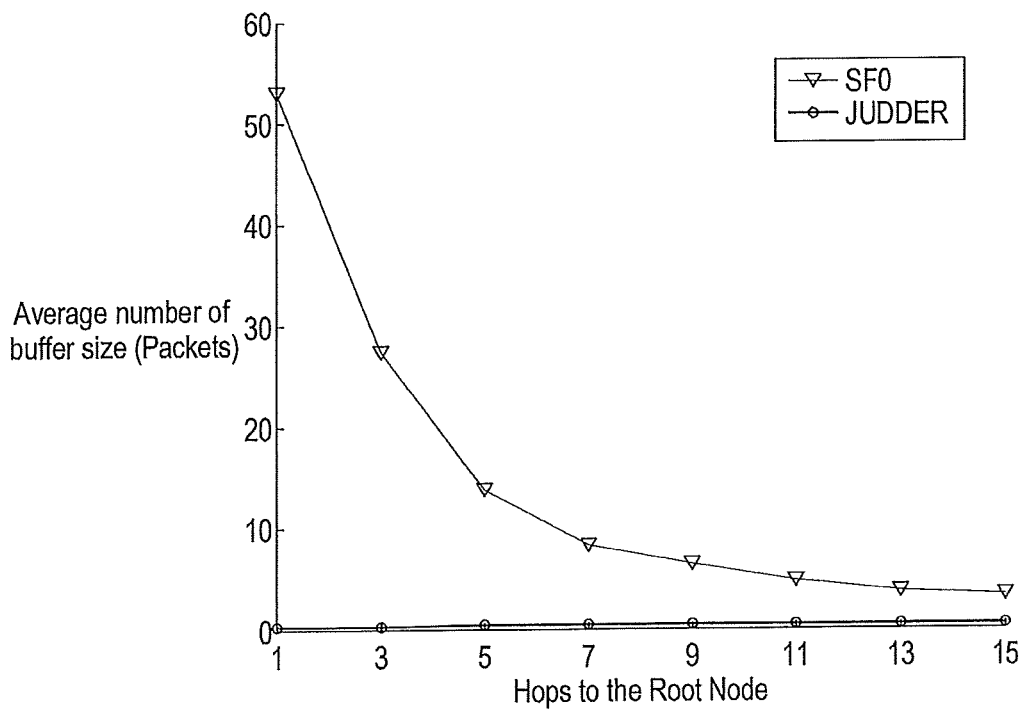
FIG. 17 is a graph comparing the average buffer size in terms of the hops to the root node for methods according to the disclosure compared to prior art methods.

FIG. 12 schematically illustrates an exemplar communication sequence between a root node, lead node and child node. As can be seen and is described above, the lead node first syncs with the root node and sends a signal request. In response to receiving the signal request, the root node determines which list the lead node should be assigned to and sends this list assignation, along with the corresponding list of frequency channels for that list and the downlink variable ($f_{downlink}$) to the lead node. The lead node receives and stores this information. The lead node also calculates the downlink parameter from the downlink variable. The lead node then transmits a request for at least one timeslot to the root node. The root node allocates timeslots (at least one uplink and common timeslot) in the schedule to communication with the lead node and transmits the schedule to the lead node in a response. The allocated timeslots will be those which are earmarked for use by the first list (e.g. odd-numbered timeslots).

A child node then syncs with the lead node and sends a signal request. The lead node responds with a list assignation, a corresponding list of channels to use and a downlink variable. The child node stores this information, calculates a downlink parameter and updates its list of channels accordingly. The child node then sends a request for timeslots to the lead node. The lead node checks which timeslots are not assigned to communication with the root node and allocates free timeslots (uplink and common timeslots) to the child node. The lead node transmits this schedule to the child node in a response to the request.

A request which includes a new downlink variable ($f_{downlink}$) may be transmitted from the root node to the lead node if the downlink parameter needs to be updated (for example to increase the number of downlink timeslots per slotframe). The lead node may update its download parameter in light of the new downlink variable and then transmit the new downlink variable to the child node which updates its downlink parameter in turn.

FIGS. 13 to 17 are graphs of data illustrating exemplar comparative performance of examples according to this disclosure ("JUDDER") compared to an existing distributed scheduling method ("SF0") disclosed in an Internet Engineering Task Force draft: "6TiSCH 6top Scheduling Function Zero (SF0)".

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:
   receiver circuitry configured to receive a request for at least one timeslot for transmitting a first amount of data to the electronic apparatus from a first wireless apparatus of a child node of the electronic apparatus;
   processor circuitry configured to determine a schedule allocating timeslots to communication between the electronic apparatus and the first wireless apparatus; and
   transmitter circuitry configured to transmit the schedule to the first wireless apparatus, wherein
   the number of timeslots allocated by the schedule is greater than the minimum number of timeslots required to transmit the first amount of data; and
   a first one of the timeslots allocated by the schedule is an uplink timeslot in which the electronic apparatus is scheduled to receive data from the first wireless apparatus; and
   a second one of the timeslots allocated by the schedule is a common timeslot which is useable as either an uplink timeslot in which the electronic apparatus is scheduled to receive data from the first wireless apparatus, or a downlink timeslot in which the electronic apparatus is scheduled to transmit data to the first wireless apparatus.

2. The electronic apparatus of claim 1, wherein the number of timeslots allocated by the schedule is twice the number of timeslots required to transmit the first amount of data to the electronic apparatus; and
   half of the timeslots allocated by the schedule are uplink timeslots in which the electronic apparatus is scheduled to receive data from the first wireless apparatus; and
   half of the timeslots allocated by the schedule are common timeslots which are selectively operable as uplink timeslots in which the electronic apparatus is scheduled to receive data from the first wireless apparatus, or downlink timeslots in which the electronic apparatus is scheduled to transmit data to the first wireless apparatus.

3. The electronic apparatus of claim 1, wherein the timeslots allocated by the schedule are arranged in the schedule such that a free timeslot immediately follows every timeslot allocated to communication between the electronic apparatus and the first wireless apparatus;
   wherein a free timeslot is a timeslot not allocated to communication between the electronic apparatus and the first wireless apparatus.

4. The electronic apparatus of claim 1, wherein
   the transmitter circuitry is configured to transmit a request for at least one timeslot to a second wireless apparatus;
   the circuitry is configured to receive a schedule from the second wireless apparatus which allocates timeslots to communication between the electronic apparatus and the second wireless apparatus; and
   the processor circuitry is configured to allocate timeslots which are not allocated to communication between the electronic apparatus and the second wireless apparatus to communication between the electronic apparatus and the first wireless apparatus.

5. The electronic apparatus of claim 1, wherein the value of a downlink parameter determines whether the common timeslot is operable as an uplink timeslot or a downlink timeslot.

6. The electronic apparatus of claim 1, wherein the receiver circuitry is configured to receive a list assignation from a second wireless apparatus which assigns the electronic apparatus to one of a first and second list; and the processor circuitry is configured to set a frequency channel, or plurality of frequency channels, over which the electronic apparatus communicates, based on the list assignation.

7. An electronic apparatus comprising:
   receiver circuitry configured to receive a request for at least one timeslot for transmitting a first amount of data to the electronic apparatus from a first wireless apparatus of a child node of the electronic apparatus;

processor circuitry configured to determine a schedule allocating timeslots to communication between the electronic apparatus and the first wireless apparatus; and transmitter circuitry configured to transmit the schedule to the first wireless apparatus, wherein
the number of timeslots allocated by the schedule is greater than the minimum number of timeslots required to transmit the first amount of data; and
a first one of the timeslots allocated by the schedule is an uplink timeslot in which the electronic apparatus is scheduled to receive data from the first wireless apparatus; and
a second one of the timeslots allocated by the schedule is a common timeslot which is usable as either an uplink timeslot in which the electronic apparatus is scheduled to receive data from the first wireless apparatus, or a downlink timeslot in which the electronic apparatus is scheduled to transmit data to the first wireless apparatus;
the transmitter circuitry is further configured to transmit the schedule to the first wireless apparatus,
wherein the value of a downlink parameter determines whether the common timeslot is operable as an uplink timeslot or a downlink timeslot; and the receiver circuitry is configured to receive a downlink variable from a second wireless apparatus; and the processor circuitry is configured to calculate the downlink parameter based on the downlink variable.

8. An electronic apparatus comprising:
receiver circuitry configured to receive a request for at least one timeslot for transmitting a first amount of data to the electronic apparatus from a first wireless apparatus of a child node of the electronic apparatus;
processor circuitry configured to determine a schedule allocating timeslots to communication between the electronic apparatus and the first wireless apparatus; and
transmitter circuitry configured to transmit the schedule to the first wireless apparatus, wherein
the number of timeslots allocated by the schedule is greater than the minimum number of timeslots required to transmit the first amount of data; and
a first one of the timeslots allocated by the schedule is an uplink timeslot in which the electronic apparatus is scheduled to receive data from the first wireless apparatus; and
a second one of the timeslots allocated by the schedule is a common timeslot which is usable as either an uplink timeslot in which the electronic apparatus is scheduled to receive data from the first wireless apparatus, or a downlink timeslot in which the electronic apparatus is scheduled to transmit data to the first wireless apparatus, wherein
the receiver circuitry is configured to receive a signal request from the first wireless apparatus;
the processor circuitry is configured to assign the first wireless apparatus to a first list or a second list;
wherein assigning the first wireless apparatus to a first list or a second list comprises:
checking the number of timeslots that have been allocated by the electronic apparatus to communication with wireless apparatuses already assigned to the first list; and
checking the number of timeslots that have been allocated by the electronic apparatus to communication with wireless apparatuses already assigned to the second list; and
assigning the first wireless apparatus to the list with the lower number of timeslots allocated by the schedule.

9. The electronic apparatus of claim 8, wherein
timeslots in the schedule are sequentially numbered; and
the processor circuitry is configured to allocate odd-numbered timeslots to communication between the electronic apparatus and a first wireless apparatus assigned to the first list and even-numbered timeslots to communication between the electronic apparatus and a first wireless apparatus assigned to the second list.

10. An electronic apparatus comprising:
transmitter circuitry configured to transmit a request to a second wireless apparatus of a parent node of the electronic apparatus for at least one timeslot for transmitting a first amount of data to the second wireless apparatus;
receiver circuitry configured to receive a schedule from the second wireless apparatus which allocates timeslots to communication between the electronic apparatus and the second wireless apparatus, wherein
the number of timeslots allocated by the schedule is greater than the minimum number of timeslots required to transmit the first amount of data to the second wireless apparatus; and
processor circuitry configured to:
transmit data to the second wireless apparatus using the transmitter circuitry in a first one of the timeslots allocated by the schedule; and
selectively:
transmit data to the second wireless apparatus using the transmitter circuitry in a second one of the timeslots allocated by the schedule; or
receive data from the second wireless apparatus using the receiver circuitry in the second one of the timeslots allocated by the schedule.

11. The electronic apparatus of claim 10, wherein the value of a downlink parameter determines whether the common timeslot is operable as an uplink timeslot or a downlink timeslot;
the circuitry is operable to receive a downlink variable from a parent neighboring device; and
the processor circuitry is configured to calculate the downlink parameter based on the downlink variable.

12. The electronic apparatus of claim 10, wherein the receiver circuitry is operable to receive a signal request from the first wireless apparatus;
the processor circuitry is configured to assign the first wireless apparatus to a first list or a second list,
wherein assigning the first wireless apparatus to a first list or a second list comprises:
checking the number of timeslots that have been allocated by the electronic apparatus to communication with neighboring devices already assigned to the first list; and
checking the number of timeslots that have been allocated by the electronic apparatus to communication with neighboring devices already assigned to the second list; and
assigning the first wireless apparatus to the list with the lower number of timeslots.

13. An electronic apparatus comprising:
receiver circuitry configured to receive a request for timeslots;

processor circuitry configured to determine a schedule allocating timeslots to communication between the electronic apparatus and a first wireless apparatus, wherein
the timeslots allocated to communication between the electronic apparatus and the first wireless apparatus are arranged in the schedule such that a free timeslot immediately follows every timeslot allocated to communication between the electronic apparatus and the first wireless apparatus;
wherein a free timeslot is a timeslot not allocated to communication between the electronic apparatus and the first wireless apparatus; and
a wireless transmitter operable to transmit the schedule to the first wireless apparatus,
wherein at least one of the timeslots allocated to communication includes common timeslots which are selectively operable as either uplink timeslots or downlink timeslots, the uplink timeslots being timeslots in which the electronic apparatus is scheduled to receive data from the first wireless apparatus, the downlink timeslots being timeslots in which the electronic apparatus is scheduled to transmit data to the first wireless apparatus.

14. A method for defining a schedule for a wireless local area network comprising a plurality of electronic apparatuses, wherein the schedule allocates timeslots to communication between neighboring electronic apparatuses, the method comprising:
a first wireless apparatus transmitting a request to a second wireless apparatus for at least one timeslot for communicating a first amount of data to the second wireless apparatus;
the second wireless apparatus allocating timeslots in a schedule to communication between the first wireless apparatus and the second wireless apparatus;
wherein the number of timeslots allocated by the schedule is greater than the minimum number of timeslots required to communicate the first amount of data; and
a first one of the timeslots allocated by the schedule is an uplink timeslot in which the second wireless apparatus is scheduled to receive data from the first wireless apparatus; and
a second one of the timeslots allocated by the schedule is a common timeslot which is useable as either an uplink timeslot in which the second wireless apparatus is scheduled to receive data from the first wireless apparatus, or a downlink timeslot in which the second wireless apparatus is scheduled to transmit data to the first wireless apparatus;
the second wireless apparatus sending the schedule to the first wireless apparatus.

15. The method of claim 14, wherein the number of timeslots allocated by the schedule is twice the number of timeslots required to transmit the first amount of data to an electronic apparatus;
half of the timeslots allocated by the schedule are uplink timeslots in which the electronic apparatus is scheduled to receive data from the first wireless apparatus;
half of the timeslots allocated by the schedule are common timeslots which are selectively operable as uplink timeslots in which the electronic apparatus is scheduled to receive data from the first wireless apparatus or downlink timeslots in which the electronic apparatus is scheduled to transmit data to the first wireless apparatus.

16. The method of claim 14, wherein the timeslots allocated by the schedule are arranged in the schedule such that a free timeslot immediately follows every timeslot allocated to communication between the first wireless apparatus and the second wireless apparatus;
wherein a free timeslot is a timeslot not allocated to communication between the first wireless apparatus and the second wireless apparatus.

17. The method of claim 14, further comprising:
a third wireless apparatus transmitting a request to the first wireless apparatus for at least one timeslot for communicating a second amount of data to the first wireless apparatus;
the first wireless apparatus allocating timeslots in a schedule which are not allocated to communication between the first wireless apparatus and the second wireless apparatus to communication between the first wireless apparatus and the third wireless apparatus; and
the first wireless apparatus sending the schedule to the third wireless apparatus.

18. The method of claim 14, further comprising the first wireless apparatus receiving a list assignation from the second wireless apparatus which assigns the first wireless apparatus to one of a first and second list; and
the first wireless apparatus setting a frequency channel, or plurality of frequency channels, over which the first wireless apparatus communicates, based on the list assignation.

19. A method for defining a schedule for a wireless local area network comprising a plurality of electronic apparatuses, wherein the schedule allocates timeslots to communication between neighboring electronic apparatuses, the method comprising:
a first wireless apparatus transmitting a request to a second wireless apparatus for at least one timeslot for communicating a first amount of data to the second wireless apparatus;
the second wireless apparatus allocating timeslots in a schedule to communication between the first wireless apparatus and the second wireless apparatus;
wherein the number of timeslots allocated by the schedule is greater than the minimum number of timeslots required to communicate the first amount of data; and
a first one of the timeslots allocated by the schedule is an uplink timeslot in which the second wireless apparatus is scheduled to receive data from the first wireless apparatus; and
a second one of the timeslots allocated by the schedule is a common timeslot which is useable as either an uplink timeslot in which the second wireless apparatus is scheduled to receive data from the first wireless apparatus, or a downlink timeslot in which the second wireless apparatus is scheduled to transmit data to the first wireless apparatus;
the second wireless apparatus sending the schedule to the first wireless apparatus, further comprising:
the first wireless apparatus transmitting a signal request to the second wireless apparatus;
the second wireless apparatus receiving the signal request from the first wireless apparatus;
the second wireless apparatus assigning the first wireless apparatus to a first list or a second list;
wherein assigning the first wireless apparatus to a first list or a second list comprises:

checking the number of timeslots that have been allocated by the second wireless apparatus to communication with neighboring devices already assigned to the first list; and checking the number of timeslots that have been allocated by the second wireless apparatus to communication with neighboring devices already assigned to the second list; and assigning the first wireless apparatus to the list with the lower number of timeslots.

20. A method for defining a schedule for a wireless local area network comprising a plurality of electronic apparatuses, wherein the schedule allocates timeslots to communication between neighboring electronic apparatuses, the method comprising:

a first wireless apparatus sending a request to a second wireless apparatus for timeslots;

the second wireless apparatus allocating timeslots in a schedule to communication with the first wireless apparatus;

the allocated timeslots are arranged in the schedule such that a free timeslot immediately follows every timeslot allocated to communication between the first wireless apparatus and the second wireless apparatus, wherein the free timeslot is a timeslot not allocated to communication between the first wireless apparatus and the second wireless apparatus; and the second wireless apparatus sending the schedule to the first wireless apparatus, wherein at least one of the timeslots includes common timeslots which are selectively operable as either uplink timeslots or downlink timeslots, the uplink timeslots being timeslots in which an electronic apparatus is scheduled to receive data from the first wireless apparatus, the downlink timeslots being timeslots in which the electronic apparatus is scheduled to transmit data to the first wireless apparatus.

21. A non-transitory computer readable medium storing a computer program which is for defining a schedule for a wireless local area network comprising a plurality of electronic apparatuses, the schedule allocating timeslots to communication between neighboring electronic apparatuses, the program being executed by a computer to provide the steps of:

transmitting, by a first wireless apparatus, a request to a second wireless apparatus for at least one timeslot for communicating a first amount of data to the second wireless apparatus;

allocating, by the second wireless apparatus, timeslots in a schedule to communication between the first wireless apparatus and the second wireless apparatus, the number of timeslots allocated by the schedule being greater than the minimum number of timeslots required to communicate the first amount of data, a first one of the timeslots allocated by the schedule is an uplink timeslot in which the second wireless apparatus is scheduled to receive data from the first wireless apparatus, a second one of the timeslots allocated by the schedule being a common timeslot which is useable as either an uplink timeslot in which the second wireless apparatus being scheduled to receive data from the first wireless apparatus, or a downlink timeslot in which the second wireless apparatus is scheduled to transmit data to the first wireless apparatus; and sending, by the second wireless apparatus, the schedule to the first network device.

* * * * *